US011720608B2

(12) United States Patent
Boyns et al.

(10) Patent No.: US 11,720,608 B2
(45) Date of Patent: Aug. 8, 2023

(54) METHOD AND APPARATUS FOR AGGREGATING AND PRESENTING DATA ASSOCIATED WITH GEOGRAPHIC LOCATIONS

(71) Applicant: QUALCOMM Incorporated, San Diego, CA (US)

(72) Inventors: Mark Boyns, Alpine, CA (US); Chandrakant Mehta, Cupertino, CA (US); Jeffrey Tsay, San Marcos, CA (US); Gridhar Mandyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/165,879

(22) Filed: Feb. 2, 2021

(65) Prior Publication Data
US 2021/0157828 A1    May 27, 2021

Related U.S. Application Data

(63) Continuation of application No. 15/385,539, filed on Dec. 20, 2016, now Pat. No. 10,942,950, which is a
(Continued)

(51) Int. Cl.
*G06F 16/30* (2019.01)
*G06F 16/29* (2019.01)
(Continued)

(52) U.S. Cl.
CPC ............ *G06F 16/29* (2019.01); *H04L 67/306* (2013.01); *H04L 67/535* (2022.05); *H04W 4/029* (2018.02); *H04W 4/185* (2013.01); *H04W 4/21* (2018.02)

(58) Field of Classification Search
CPC ....... G06F 16/29; H04L 67/22; H04L 67/306; H04W 4/02; H04W 4/029; H04W 4/185; H04W 4/21
See application file for complete search history.

(56) References Cited

U.S. PATENT DOCUMENTS

| 5,940,803 | A | * | 8/1999 | Kanemitsu | ............. | G06Q 10/02 |
| | | | | | | 705/5 |
| 7,565,157 | B1 | * | 7/2009 | Ortega | .................... | H04W 4/18 |
| | | | | | | 455/414.3 |

(Continued)

FOREIGN PATENT DOCUMENTS

| CN | 1489738 A | 4/2004 |
| CN | 1934569 A | 3/2007 |

(Continued)

OTHER PUBLICATIONS

Web Archive of Article entitled "Help/FAQ/Photos", by Flikr, dated Mar. 10, 2007, available at https://web.archive.org/web/20070310014216/http://www.flickr.com/help/photos/ (Year: 2007).*

(Continued)

*Primary Examiner* — Mahesh H Dwivedi
(74) *Attorney, Agent, or Firm* — Qualcomm Incorporated

(57) ABSTRACT

Implementations relate to systems and methods for aggregating and presenting data related to geographic locations. Geotag data related to geographic locations and associated features or attributes can be collected to build a regional profile characterizing a set of locations within the region. Geotag data related to the constituent locations, such as user ratings or popularity ranks for restaurants, shops, parks, or other features, sites, or attractions, can be combined to generate a profile of characteristics of locations in the region. The platform can generate recommendations of locations to transmit to the user of a mobile device, based for instance on the location of the device in the region as
(Continued)

reported by GPS or other location service and the regional profile. Geotag data can include audio data analyzed using region-specific terms, and user recommendations can be presented via dynamic menus based on regional profiles, user preferences or other criteria.

20 Claims, 17 Drawing Sheets

Related U.S. Application Data continuation of application No. 12/470,475, filed on May 21, 2009, now Pat. No. 9,646,025.

(60) Provisional application No. 61/056,406, filed on May 27, 2008.

(51) Int. Cl.
| | | |
|---|---|---|
| *H04W 4/21* | (2018.01) | |
| *H04W 4/029* | (2018.01) | |
| *H04W 4/18* | (2009.01) | |
| *H04L 67/50* | (2022.01) | |
| *H04L 67/306* | (2022.01) | |

(56) References Cited

U.S. PATENT DOCUMENTS

| | | | |
|---|---|---|---|
| 7,599,950 B2 | 10/2009 | Walther et al. | |
| 8,145,661 B1 | 3/2012 | Billman et al. | |
| 9,646,025 B2 | 5/2017 | Boyns et al. | |
| 9,910,923 B2 | 3/2018 | Reese et al. | |
| 2002/0147619 A1 | 10/2002 | Floss et al. | |
| 2002/0147717 A1 | 10/2002 | Barros et al. | |
| 2002/0184196 A1 | 12/2002 | Lehmeier et al. | |
| 2002/0198882 A1 | 12/2002 | Linden et al. | |
| 2003/0050805 A1 | 3/2003 | Gouyet et al. | |
| 2003/0060212 A1* | 3/2003 | Thomas | H04W 12/06 |
| | | | 455/457 |
| 2003/0140040 A1 | 7/2003 | Schiller | |
| 2003/0225510 A1 | 12/2003 | Ono et al. | |
| 2004/0125216 A1 | 7/2004 | Keskar et al. | |
| 2004/0174443 A1 | 9/2004 | Simske | |
| 2005/0071657 A1* | 3/2005 | Ryan | G06F 21/6218 |
| | | | 713/193 |
| 2005/0278371 A1 | 12/2005 | Funk et al. | |
| 2006/0026170 A1 | 2/2006 | Kreitler et al. | |
| 2006/0099970 A1* | 5/2006 | Morgan | H04L 67/24 |
| | | | 455/456.6 |
| 2006/0200309 A1 | 9/2006 | Yu et al. | |
| 2006/0224384 A1 | 10/2006 | Dow et al. | |
| 2006/0229807 A1* | 10/2006 | Sheha | H04W 4/024 |
| | | | 701/468 |
| 2006/0270419 A1* | 11/2006 | Crowley | H04M 3/42 |
| | | | 455/456.2 |
| 2006/0271277 A1 | 11/2006 | Hu et al. | |
| 2007/0005419 A1 | 1/2007 | Horvitz et al. | |
| 2007/0032247 A1 | 2/2007 | Shaffer et al. | |
| 2007/0073477 A1 | 3/2007 | Krumm et al. | |
| 2007/0078883 A1 | 4/2007 | Hayashi et al. | |
| 2007/0079321 A1 | 4/2007 | Ott | |
| 2007/0112729 A1 | 5/2007 | Wiseman et al. | |
| 2007/0112739 A1 | 5/2007 | Burns et al. | |
| 2007/0156403 A1 | 7/2007 | Coifman | |
| 2007/0233582 A1 | 10/2007 | Abhyanker | |
| 2007/0281689 A1 | 12/2007 | Altman et al. | |
| 2007/0282621 A1* | 12/2007 | Altman | G06Q 30/02 |
| | | | 705/319 |
| 2007/0294127 A1 | 12/2007 | Zivov | |
| 2007/0294187 A1 | 12/2007 | Scherrer | |
| 2008/0005674 A1 | 1/2008 | Wattenberg et al. | |
| 2008/0016051 A1 | 1/2008 | Schiller | |
| 2008/0070593 A1 | 3/2008 | Altman et al. | |
| 2008/0076451 A1 | 3/2008 | Sheha et al. | |
| 2008/0086368 A1 | 4/2008 | Bauman et al. | |
| 2008/0097966 A1 | 4/2008 | Choi et al. | |
| 2008/0104246 A1 | 5/2008 | Katz et al. | |
| 2008/0109760 A1 | 5/2008 | Stambaugh | |
| 2008/0109761 A1 | 5/2008 | Stambaugh | |
| 2008/0132251 A1 | 6/2008 | Altman et al. | |
| 2008/0133488 A1 | 6/2008 | Bandaru et al. | |
| 2008/0228600 A1 | 9/2008 | Treyz et al. | |
| 2008/0297409 A1 | 12/2008 | Klassen et al. | |
| 2008/0307311 A1 | 12/2008 | Eyal | |
| 2009/0012955 A1 | 1/2009 | Chu et al. | |
| 2009/0024315 A1 | 1/2009 | Scheibe | |
| 2009/0033633 A1 | 2/2009 | Newman et al. | |
| 2009/0077058 A1 | 3/2009 | Roberts | |
| 2009/0111487 A1 | 4/2009 | Scheibe | |
| 2009/0112727 A1* | 4/2009 | Chi | G06Q 30/02 |
| | | | 705/1.1 |
| 2009/0143977 A1 | 6/2009 | Beletski et al. | |
| 2009/0157613 A1 | 6/2009 | Strohmenger et al. | |
| 2009/0177386 A1 | 7/2009 | Haase | |
| 2009/0197681 A1 | 8/2009 | Krishnamoorthy et al. | |
| 2009/0216633 A1 | 8/2009 | Whitsett et al. | |
| 2009/0222482 A1 | 9/2009 | Klassen et al. | |
| 2009/0279794 A1 | 11/2009 | Brucher et al. | |
| 2009/0280465 A1 | 11/2009 | Schiller | |
| 2009/0290812 A1 | 11/2009 | Naaman et al. | |
| 2010/0063721 A1 | 3/2010 | Won | |
| 2010/0076968 A1 | 3/2010 | Boyns et al. | |
| 2011/0093458 A1 | 4/2011 | Zheng et al. | |
| 2011/0307478 A1 | 12/2011 | Pinckney et al. | |
| 2015/0052030 A1 | 2/2015 | McCullough et al. | |
| 2017/0103089 A1 | 4/2017 | Boyns et al. | |

FOREIGN PATENT DOCUMENTS

| | | |
|---|---|---|
| CN | 101162153 A | 4/2008 |
| EP | 1045345 A1 | 10/2000 |
| JP | 2003044512 A | 2/2003 |
| JP | 2003344076 A | 12/2003 |
| JP | 2004252592 A | 9/2004 |
| JP | 2005275985 A | 10/2005 |
| JP | 2005300989 A | 10/2005 |
| JP | 2007304977 A | 11/2007 |
| JP | 2007328469 A | 12/2007 |
| JP | 2008046987 A | 2/2008 |
| KR | 100820319 B1 | 4/2008 |
| WO | 2003093771 A1 | 11/2003 |
| WO | 2005091175 A1 | 9/2005 |
| WO | 2007143106 A2 | 12/2007 |
| WO | 2008045701 A2 | 4/2008 |

OTHER PUBLICATIONS

Web Archive of Article entitled "Help/FAQ/", by Flickr, collectively dated Apr. 9, 2007 (Year: 2007).*

Agarwal D., et al., ""Mining Customer Care Dialogs for Daily News"", IEEE Transactions on Speech and Audio Processing, IEEE Service Center, New York, NY, US, vol. 13, No. 5, Sep. 1, 2005 (Sep. 1, 2005), pp. 652-660, XP011137512 ISSN: 1063-6676 p. 653, left-hand column, line 26—right-hand column, line 22 p. 655, right-hand column, lines 7-13 p. 658, left-hand columns, lines 10-50.

Ahern S., et al., "World Explorer: Visualizing Aggregate Data fromUnstructured Text in Geo-Referenced Collections," Proceedings of the 7th ACM/IEEE-CS Joint Conference on Digital Libraries JCDL'07, Jun. 17-22, 2007, 10 pages.

Article entitled "Context-Aware Recommendations in the Mobile Tourist Application COMPASS", by Van Setten et al., dated Jan. 2004, 11 pages.

Article entitled "Deconstructing TripAdvisor," dated Jun. 1, 2007 by Keates, 6 pages.

Article entitled "One-Stop Shopping for that Dream Vacation", by Higgins, dated Feb. 11, 2007, pp. 1-4.

Bellotti V., et al., "Activity-Based Serendipitous Recommendations with the Magitti Mobile Leisure Guide", CHI 2008 Proceedings, Italy, Apr. 5-10, 2008, pp. 1157-1166.

(56) References Cited

OTHER PUBLICATIONS

Bouvin N O ., et al., "HyCon: A Framework for Context-Aware Mobile Hypermedia", New Review of Hypermedia and Multimedia, Taylor Graham, London, GB, vol. 9, No. 1, Jan. 1, 2003, pp. 59-88, XP008103774, ISSN: 1361-4568, DOI:10.1080/13614560410001725310.
Burke R.D., "Semantic Ratings and Heuristic Similarity for Collaborative Filtering", AAAI Technical Report WS-00-04, Article entitled, Copyright 2000, pp. 14-20.
Burke R.D., et al., "Knowledge-Based Navigation of Complex Information Spaces", Article entitled, Copyright 1996, pp. 462-468.
Burke R.D., et al., "The Find Me Approach to Assisted Browsing", IEEE Expert, Article entitled, Copyright 1997. Apr. 7, 2020, pp. 32-40.
Burke R.D., "Interactive Critiquing for Catalog Navigation in E-Commerce", Article entitled, Copyright 2002, pp. 245-267.
Dictionary Definition of "adjacent" from Merriam-Webster, dated Jul. 20, 2020, pp. 1-11.
European Search Report—EP19165586—Search Authority—The Hague—dated Jul. 19, 2019.
Horozov T., et al., "Using Location for Personalized POI Recommendations in Mobile Environments," Proceedings of the 2005 Symposium on Applications and the Internet SAINT'06, Jan. 23-27, 2006, pp. 124-129.
International Preliminary Report on Patentability—PCT/US2009/044991, The International Bureau of WIPO—Geneva, Switzerland, dated Dec. 13, 2020.
International Search Report and Written Opinion—PCT/US2009/044991—ISA/EPO—dated Jan. 13, 2010.
Kramer R., et al., Article entitled "Development and Evaluation of a Context-Driven Mobile Tourist Guide", University of Applied Sciences Zittau-Goerlitz I, D-02826 Goerlitz, Germany, dated Jan. 2007, pp. 1-13.
Kramer R., et al., Article entitled "Web-based Recommenders for Personalized City Tours: A Usage Analysis", ENTER 2007 organized by the International Federation for IT & Travel and Tourism (IFITT) in Ljubljana (Slovenia) Jan. 24-26, 2007, 13 Pages.
Patel R., et al., "Enhancing Access to Situational Vocabulary by Leveraging Geographic Context", Assistive Technology Outcomes and Benefits, vol. 4, No. 1, 2007, pp. 99-114, XP002548233, p. 99, right-hand column, lines 24-27 p. 101, left-hand column, line 1—right-hand column, last line p. 102, right-hand column, last line—p. 105, right-hand column, line 36 p. 108, left-hand column, line 16—p. 109, right-hand column, last line.
Review of the San Francisco Cable Car Museum by user Gourmet G. dated Jul. 29, 2005, by Yelp., 8 pages.
State Intellectual Property Office of the People's Republic of China Notice of Acceptance of Request for Invalidation for Application No. 200980118986.X dated Dec. 19, 2017, 1 Page.
State Intellectual Property Office of the People's Republic of China Notification of Examination Decision for Invalidation Request, Application/Patent No. 200980118986.X; Case No. 4W106678, dated Aug. 30, 2018, 40 Pages.
State Intellectual Property Office of the People's Republic of China Notification of Examination Decision for Invalidation Request, Application/Patent No. 200980118986.X; Case No. 4W107288, dated Feb. 1, 2019, 73 pages.
Uematsu D., "Ba (location) log: Proposal for Using Location Information in Weblog Environment," Jul. 2004, pp. 07-01 through 07-05, URL, http://sigswo.org/programs/A401.htm.
Uematsu D., "Communication Support based on Tagged Location," Proceedings (CD-ROM) of The 19th (2005) Annual Conference of JSAI, The Japanese Society for Artificial Intelligence, Jun. 15, 2005, pp. 1-3.
Uematsu H., et al., "Balog : Location-Based Information Aggregation System", Poster Proc. of the 3rd International Semantic Web Conference (ISWC2004), 2004, [Online] Nov. 7, 2004 (Nov. 7, 2004),—Nov. 11, 2004 (Nov. 11, 2004) pp. 1-2, XP002561742 Retrieved from the Internet: URL:http://iswc2004.semanticweb.org/posters/PID-ZFOVEXEK-1090248437.pdf [retrieved on Dec. 19, 2009].
You Tube video entitled "Hilton Barbados Review", uploaded on Dec. 2, 2006, by TravelTour360, 14 Pages.
Administrative Judgment Beijing Intellectual Property Court the People's Republic of China, (2019) Jing 73 Xingchu No. 6113, Sep. 28, 2021, pp. 1-56.
Administrative Judgment made by Beijing Intellectual Property Court of the People's Republic of China, (2018) Jing 73 Xing Chu No. 12230, Dec. 25, 2020, pp. 1-56.
Prosecution History of U.S. Pat. No. 9646025 dated from May 21, 2009 through Apr. 19, 2017, 1505 pages.
Prosecution History of Patent-in-Suit.

* cited by examiner

METHOD AND APPARATUS FOR AGGREGATING AND PRESENTING DATA ASSOCIATED WITH GEOGRAPHIC LOCATIONS

CROSS-REFERENCE TO RELATED APPLICATION

The present application is a continuation of U.S. application Ser. No. 15/385,539, filed Dec. 20, 2016, entitled "Method and Apparatus for Aggregating and Presenting Data Associated with Geographic Locations," which is a continuation of U.S. application Ser. No. 12/470,475, filed May 21, 2009, entitled "Method and Apparatus for Aggregating and Presenting Data Associated with Geographic Locations," which claims priority to U.S. Provisional Application No. 61/056,406, filed May 27, 2008, entitled "Method and Apparatus for Aggregating and Presenting Data Associated with Geographic Locations," assigned or under obligation of assignment to the same entity as this application, and which provisional application is incorporated by reference herein.

BACKGROUND

The present teachings relate generally to aggregation and presentation of data associated with geographic locations, and more particularly, to the analysis of geographic data tags generated by mobile devices or other sources to generate a regional profile characterizing features, attractions, and other points of interest for a given geographic area, which can be used to generate recommendations and other services for users.

In location-based services in cellular and other applications, a "tag" can be a keyword, text, or other attribute that is assigned to a piece of information to describe that information. One or more tags can be assigned to a piece of information by one or more users. A geographic data tag ("geotag") can be a type of tag that incorporates a geographic location, such as latitude/longitude coordinates, along with associated attributes. A geotag can allow descriptive information to be associated with a physical location on Earth.

Presently, various Websites provide a capability to add geographic location information to items such as digital photos, tickets, blogs, and the like. Some digital cameras have the capability to add geographic location information to photos when taken, but do not provide the capability to automatically associate a piece of geotag information with the geographic location. Moreover, while mobile phones or digital cameras may be able to create geotags to attach to individual photographs or other objects, and share those geotagged objects directly with other users, no platform exists which can aggregate and analyze higher-order attributes reflected in geotagged data received from a number of users.

For instance, certain cellular phones may permit a user to store a map of visited locations in a given city and input geotagged ratings of individual restaurants they have frequented. However, no mechanism is available to upload that geotag information to a collective database that could then, for example, assemble and sort that information to make collective regional ratings of available restaurants to recommend to the user population, at large. Marketing and recommendation opportunities may therefore go unexploited, since the collective responses of users to various features and attractions in a given region are not organized or made available to other users in the vicinity. Even local residents in a region may not be aware of all the features and attractions available in their region, which information could be leveraged to create interest in new travel, vacation, recreational or other possibilities for those and other users.

Techniques and platforms may therefore be desirable that provide the capability to associate pieces of information with geographic locations in the form of geographic data tags, and aggregate and analyze the data contained in the geographic data tags to generate higher-level profiles of geographic regions, as well as produce associated recommendations derived from those regional profiles.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to the present teachings in one or more aspects, systems and methods for aggregating and presenting data associated with geographic locations are provided, in which a regional profiling platform operates to receive a set of geotag data associated with geographic locations, and analyze that content to generate collective profiles of the surrounding regions. In one or more implementations of the present teachings, the regional profiling platform can receive multiple sets of geotag data, each associated with one or more geographic locations. In one or more implementations, each of the geotags can contain a geographic identifier that identifies the associated geographic location. In one or more implementations, the embedded geographic identifier can be automatically acquired simultaneously with receiving the geotag data, and any other encoded information.

According to one or more aspects, the regional profiling platform can identify, aggregate, organize, and store one or more attributes of the associated geographic locations based on the collective set of geotag data. The collective set of geotag data can be used to derive a regional profile for a block, tract, zip code area, city, state, country, or other geographic region.

The regional profile can include, for instance, a set of points of interest (POI) available in that area, such as local restaurants, parks, sporting venues, residential sections, commercial or retail centers, or other resources in the region. The regional profile in one regard can encode and summarize characteristic or prominent features, attractions, services, or other resources available in the subject region. In one or more aspects in further regards, the regional profiling platform can access the regional profile developed for a given location, and use that profile to develop higher-order data to serve to individual users in that area, or otherwise.

For instance, the regional profiling platform can extract features in the set of local points of interest, and generate recommendations or suggestions to users for restaurants, lodging, recreation, entertainment, or other features or resources available in that region, or subsection of that region. In one or more implementations, users can store a set of individual preferences that can be used to filter the recommendations or other information they wish to receive. In one or more aspects, user profiling data produced by platforms that track or generate user profiles or preferences can likewise be used to filter recommendation information. In one or more aspects, the preferences or behavior of the user's friends, such as members of a social networking service, can also be used to filter recommendation information. In one or more aspects, users can freely add additional geotag data for locations in a region including ratings, keywords, comments, and other annotations associated with an area, to populate and update the database used to generate the regional profile. In one or more aspects, the user-supplied geotag data can include voice clips or samples whose content can be decoded using customized training sets particular to a given region. In one or more aspects, recommendation information can be presented to the user in a dynamically ordered menu or other dialog or interface that is adapted to the user's preferences, current location, or based on other variables.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated in and constitute a part of this specification, illustrate aspects of the present teachings and together with the description, serve to explain principles of the present teachings. In the figures.

DETAILED DESCRIPTION

Figure 1:
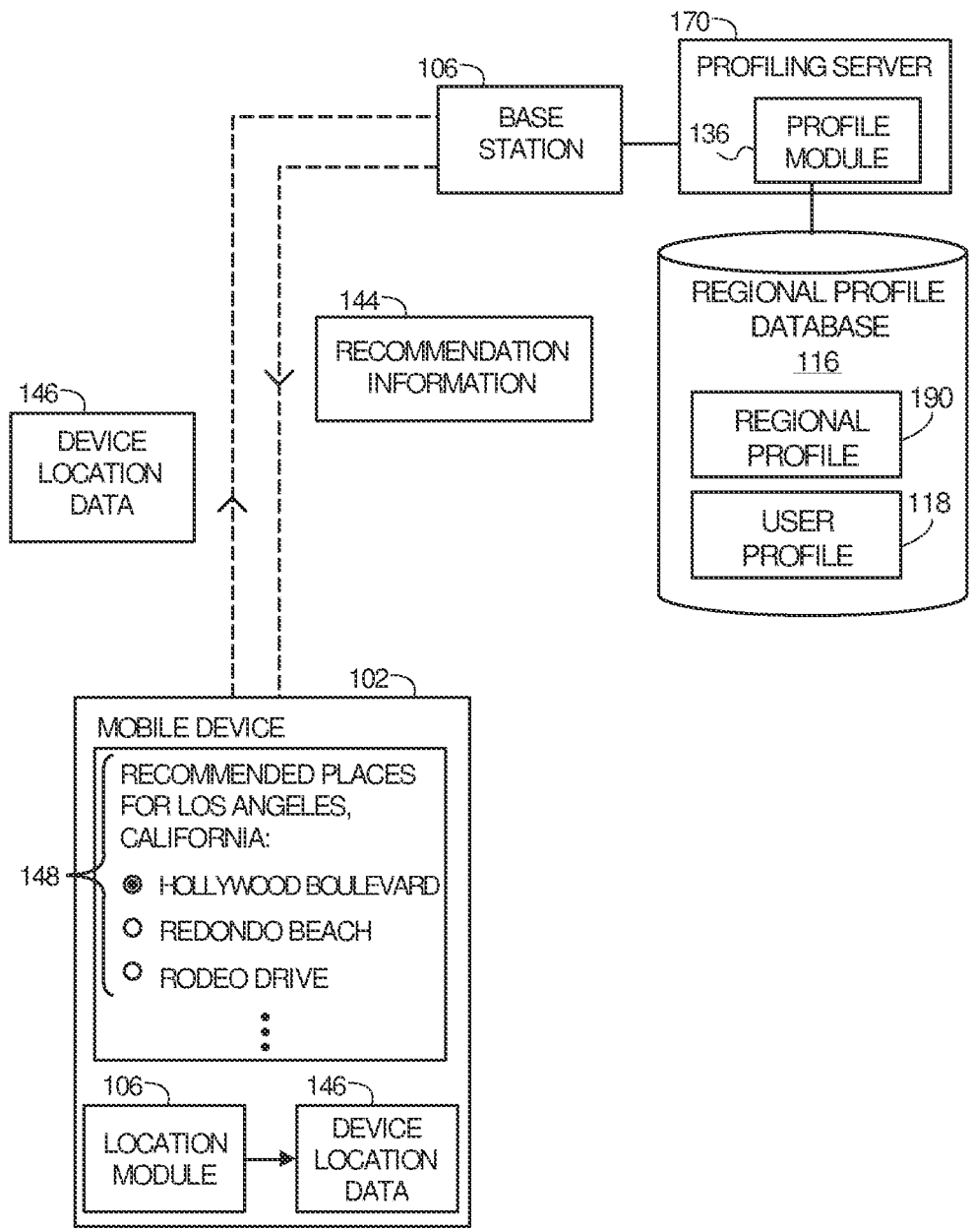
FIG. 1 shows an exemplary exchange of geotag-related information between a mobile device and profiling server, according to one or more aspects of the present teachings.

Various aspects are now described with reference to the drawings. In the following description, for purposes of explanation, numerous specific details are set forth in order to provide a thorough understanding of one or more aspects. It may be evident; however, that such aspect(s) may be practiced without these specific details.

In the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Additionally, various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Aspects of the present teachings relate to methods and apparatus for aggregating and presenting data associated with geographic locations. More particularly, in one or more aspects, platforms and techniques are provided in which geographic data tags, or geotags, for specific sites or locations are generated by mobile devices or other sources, and aggregated and analyzed to develop a regional profile for a region that is associated with the locations. In one or more aspects, the set of geotag data can include user ratings, category tags, remarks, links, and/or other data, attributes, or metadata that is stored and associated with specific locations. For instance, retail shops located on Hollywood Boulevard in Los Angeles, Calif., can be rated or described by mobile users or other consumers, and the ratings or other descriptive content or tags can be associated with a geographical position (for example, captured via a Global Positioning System, or GPS fix) for those locations.

According to one or more aspects, a profile module hosted in a profiling server or other resource or service can collect and combine the set of geotag data for a particular region, to generate the regional profile based on geotag data for the sites or locations within the region. The profile module can, for instance, organize and examine the set of geotag data and identify locations that represent or contain similar features, attractions, or resources. Thus for instance, a profiled region may contain a number of restaurants, hotels, bed and breakfast sites, or other locations associated with travel or hospitality industries. The profile module can identify sets of geotag data that identify a location as being for instance a restaurant, and further sort or organize locations identified as restaurants into different types, such as Mexican, Italian, Thai, or other categories or types. Other attributes or features of locations within a region can be identified, organized, and sorted to generate a regional profile characterizing the available features, attractions, locations, and other resources within the region.

In one or more implementations, the profiling server can receive multiple sets of geotag data from an entire population of users, and aggregate the geotag inputs from those diverse sources into an aggregate regional profile. The regional profile can be stored in a database associated with the profiling server, regional profile database, or other computing or data resources of the network. Based on the accumulated geotag information, the profiling server can extract, identify, and sort various higher-level attributes of the geographic locations in the region based on the geotags associated with specific geographic positions. For example, the profiling server can determine that an identified geographic location corresponds to an Italian restaurant. The profiling server can search the regional profile database and compile all ratings provided by users visiting and commenting upon that location, and determine that establishment serves highly rated pizza based on the attributes stored in the geotags associated with the subject geographic location. Implementations of the present teachings involve the profiling server aggregating the sets of geotag data based on the attributes of the geographic locations, and generating higher-level data sets from the aggregate information derived from the geotags. Those outputs and services can include data, outputs, or objects such as the region profile itself, a list of similar regions, a list of similar locations, a list of users having interests keyed to a location or region, and a list of hot spots and popular locations.

The regional profile and other data can then be used to produce recommendation information or other data related to points of interest in the region, and transmit that information to users of a mobile device, or other clients. For instance, the profile module can receive a request for a recommendation, or a search query, from the user of a mobile telephone or other device within, approaching, or outside a profiled region, and extract a set of recommended destination locations within the region for that user. The recommendation information can include locations filtered based on a user profile for the user of the mobile device, on a location history for that user, on a popularity rating for the potential destinations, or other criteria as well as the regional profile itself. For example, recommendation information can be generated to suggest additional or new locations that may be similar to a location at which the mobile user is currently located. In one or more aspects, the set of geotag data uploaded to the regional profile database and/or transmitted to individual mobile devices can include audio data, which can be processed according to speech recognition training sets derived from collected user voice inputs or other attributes for the region. In one or more aspects, a set of category selections from which a user can choose recommendation information can be generated and dynamically ordered based on user profiles or preferences. Other delivery techniques to transmit recommendations, ratings, links, or other data related to the regional profile of a region of interest can be used.

As used in this patent application, the term "location," "place," or "site" can refer to a point of interest (POI) identified or defined by a latitude/longitude reading, or other numerical or other geographic identifier, such as a street address. As used herein, the term "region" or "geographic region" can refer to a contained area containing one or more locations, and can mean any geographic boundary or area of various sizes, including a single address, building, or structure, a block, a tract, a county, a city, or other geographic area or unit. In one or more aspects, a "region" can be contiguous, or can be made up of areas that are discrete or not necessarily contiguous. In one or more aspects, a "region" can be defined by a bounded geometric shape, such as a circle, square, or polygon overlaying a map. In one or more aspects, a "region" can be defined by numerical boundaries, such as latitude and longitude. In one or more implementations, a "region" can be defined by other identifiers, such as a ZIP code.

Likewise, in general, as used herein a "geotag" can refer to a set of information associated with a defined geographic location. The associated information in a "geotag" can for instance be or include a keyword, tag, comment, text, video clips, images, audio samples, or other data. As used herein, the term "hotspot" can refer to a place that has been automatically determined within a profiled region or community to be popular, using auto-tagging or other processing. As used herein, the term "favorite place" can refer to a hotspot or other preferred location that is specific to a user (for instance, a home, office, or recreation site), or determined by frequency of visitation by a community of users. As used herein, the term "friend" can refer to a person identified or enumerated as a friend by a user, which can be done via a social networking site or service.

In terms of regional profiling and related activity, as generally illustrated in FIG. 1, a mobile device 102 operating in a wireless network hosted or supported by a base station 106 and associated network resources can approach, travel to or within a profiled region. In one or more aspects, mobile device 102 can include a cellular telephone, a network-enabled media player, a network-enabled personal digital assistant (PDA), a WiFi'-enabled communications device, a Global Positioning System (GPS) unit, or other wireless, mobile, or portable device, client, or hardware. In one or more aspects, mobile device 102 can incorporate a location module 106 to identify or capture the geographic location or position of mobile device 102. In one or more aspects, location module 106 can be or include various location-detection technology or services, such as Global Positioning System (GPS), base-station triangulation, and/or trilateration, the Galileo (Global System Mobile) locator service, or other techniques to capture or detect a location of the mobile device 102.

While registered to base station 106, mobile device 102 can generate a set of device location data 146 via location module 106, and transmit or upload device location data 146 to base station 106 via a wireless interface, such as a cellular interface. Base station 106 can in turn communicate with a profiling server 170, such as a remotely hosted server or set of servers, along with associated resources. In one or more aspects, profiling server 170 can host a profile module 136 configured to receive device location data 146 for one or more mobile devices 102 registered to base station 106 and/or associated regional profiling services. Profile module 136 can in one or more aspects identify a profiled region in which mobile device 102 is traveling, toward which mobile device 102 is approaching, or which lies outside the vicinity of mobile device 102. Profile module 136 can subsequently access a regional profile database 116 to locate a regional profile 190 for the region of interest, a user profile 118 for the user of mobile device 102, and generate a set of recommendation information 144 to transmit to the mobile device 102, as described herein. In one or more aspects, the user profile 118 for the user of mobile device 102 can be entered or configured by the user him or herself, including to specify categories or locations of interest, and/or can be generated or modified by profile module 136 by analysis of the user's location history, rating history, transaction history, or other behavior related to profiled region 110.

Recommendation information 144 can be presented to the user in a recommendation selector 148 displayed via a user interface 104 of mobile device, such as a graphical user interface. In one or more implementations, profile module 136 can be or include a recommendation engine such as the Xiam® recommendation engine available from Xiam Technologies Limited, a subsidiary of Qualcomm Incorporated of San Diego, Calif. In one or more implementations, other recommendation engines or logic can also or instead be used to generate or modify recommendation information 144.

Figure 2:
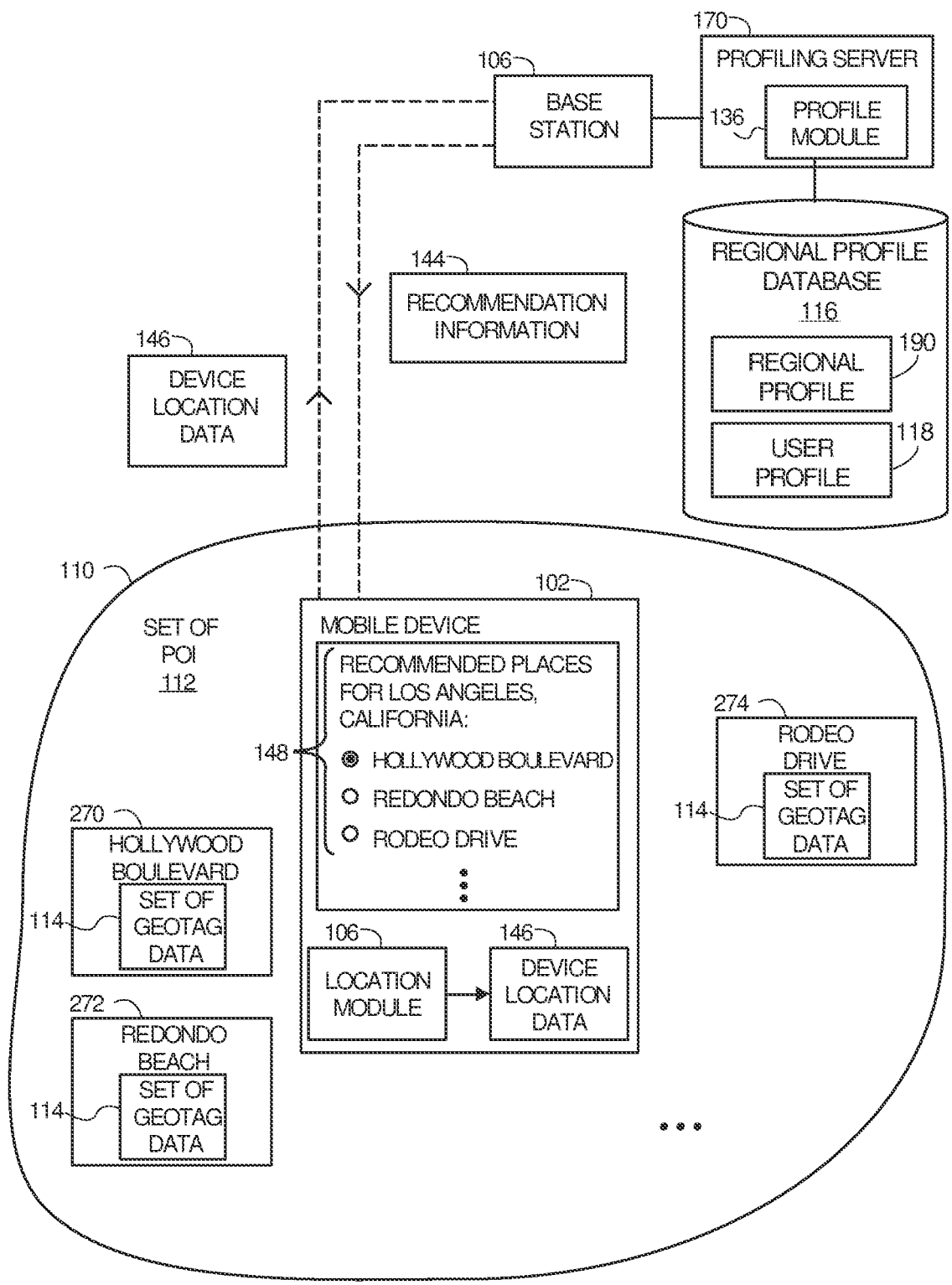
FIG. 2 illustrates an exemplary exchange of geotag-related information between a mobile device and profiling server, in context with the mobile device in a profiled region, according to one aspect.

More particularly, and as for instance illustrated in FIG. 2, a profiled region 110 can contain or have associated with the region a set of points of interest 112, which can include, merely illustratively, locations or attractions such as Hollywood Boulevard 270, Redondo Beach 272, Rodeo Drive 274, which might be registered to regional profile database 116 in the case of a profiled region 110 representing or associated with Los Angeles, Calif. Each location, place, or site identified in the set of points of interest 112 can have associated with it a set of geotag data 114, which can for instance be stored in regional profile database 116 or other data stores. When mobile device 102 is located within profiled region 110, approaching profiled region 110, the user has requested information related to profiled region 110, or at other times, profile module 136 can generate set of recommendation information 144 to transmit to mobile device 102 to display to the user via user interface 104, such as a graphical user interface.

In one or more aspects, recommendation information 144 can be developed and filtered for a specific user of mobile device 102 using the user's own user profile 118, popularity, category tag, and other information contained in or related to regional profile 190 hosted in regional profile database 116. In one or more aspects, as shown, recommendation information 144 can be or include a set of selectable or linkable suggestions, identifications, or recommendations for a location to visit within profiled region 110. In one or more aspects, as shown, recommendation information 144 can be again presented via a recommendation selector 148 displayed on user interface 104, or other gadget, menu, dialog, or interface. In one or more aspects, the display of recommendation information 144 via recommendation selector 148 can include a dialog to permit the user of mobile device 102 to view further information regarding a recommended location, such as previous user ratings for that site or facility. Other attributes or information related to recommendation information 144 can be presented or made available to the user in recommendation selector 148, or other interface. In one or more aspects, tags located within the set of geotag data 114 for one or more locations in profiled region 110 or otherwise can be made directly linkable with each other, so that, for example, the user of mobile device 102 can traverse all tags containing the tag "Italian restaurant," regardless of location.

Figure 3:
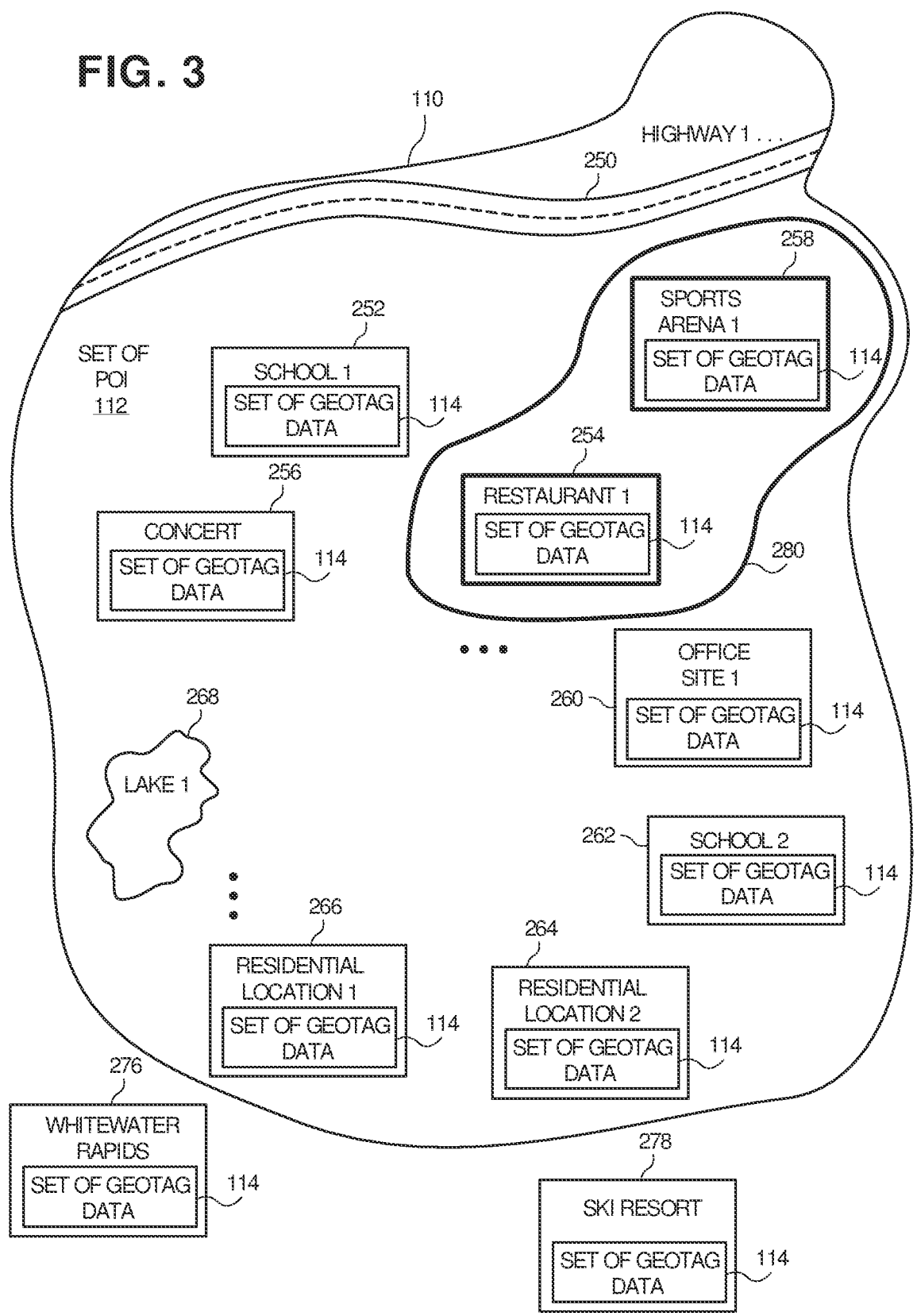
FIG. 3 illustrates an illustrative profiled region including a set of points of interest derived from user-report sets of geotag data, along with the selection of an exemplary set of recommended locations in the profiled region, according to one or more aspects.

In terms of the generation, organization, and nature of regional profile 190, and as for instance illustrated in FIG. 3, in one or more aspects, the collective characterization of a set of points of interest 112 in a profiled region 110 can be aggregated into a regional profile 190 reflecting the overall features of profiled region 110. The regional profile database 116 can, in general, profile or categorize a profiled region 110 on an aggregate level based on the total ensemble of sets of geotag data 114 collected for locations in the region. The regional profile 190 can include one or more classifications or categorizations of profiled region 110 based on the collective tags, ratings, comments, and/or other attributes for all sets of geotag data 114 associated with the profiled region 110.

The boundary or area of profiled region 110 itself can be defined or identified based on a region parameter, which can for instance include a region identifier and/or a region size. For example, the region parameter can include a radius and a longitude/latitude coordinate acquired by the mobile device 102, and/or calculated based on user input. Profiled region 110 can also be defined by a predefined region identifier or geographic code, such as a ZIP code, a municipality name, a city name, and the like. The profile module 136 can determine or identify a set of geographic locations located in profiled region 110, and retrieve one or more set of geotag data 114 associated with each of the geographic places or locations in the region. In one or more aspects, the profile module 136 can classify the geographic locations in the profiled region 110 region into groups of one or more similar locations, based on the attributes of the geographic locations stored in the set of geotag data 114 associated with the geographic locations. Profile module 136 can accordingly classify a profiled region 110 or subsections thereof into one or more different classes, such as school zones, residential, commercial, parkland or recreational, and others.

Thus profile module 136 or other logic can collect, identify, sort, organize, and categorize a set of points of interest 112 for a profiled region 110 to produce a collective or high-level characterization of the profiled region 110 to use to deliver recommendation, search, and other information to users of one or more mobile device 102, or other users. Generally speaking, the set of points of interest 112 for a given profiled region 110 can include any one or more of a variety of types, classes, or categories of features, locations, sites, attractions, or other resources located in profiled region 110. Those can include, as shown and merely illustratively, a first concert site 256 with an associated set of geotag data 114, a first school 252 (illustratively labeled as "school 1") with associated set of geotag data 114, a first restaurant 254 (illustratively labeled as "restaurant 1") with associated set of geotag data 114, a first sports arena 258 (illustratively labeled as "sports arena 1") with associated set of geotag data 114, a first office site 260 (illustratively labeled as "office site 1") with associated set of geotag data 114, a second school 262 (illustratively labeled as "school 2") with associated set of geotag data 114, a first residential location 266 (illustratively labeled as "residential location 1") with associated set of geotag data 114, a second residential location 264 (illustratively labeled as "residential location 2") with associated set of geotag data 114, and the like. In one or more aspects, set of points of interest 112 can further include, again merely illustratively, natural and man-made features such as a lake 268 or other body of water, a highway 250 (illustratively labeled as "Highway 1"), or other features, locations, sites, attractions, or other resources.

According to one or more aspects, profile module 136 or other logic can compare the set of geotag data 114 for any of the locations in profiled region 110 registered to regional profile database 116 to develop recommendation information 144 to deliver to users of one or more mobile devices 102, to users of Web browsers connected to the Internet or other public or private networks, or to other users interested in receiving information regarding a region of interest, according to various criteria and discovery processes described herein. In one or more aspects, recommendation information 144 can comprise a set of recommended locations 280, such as and merely illustratively a sports arena 258 (labeled "sports arena 1") and a restaurant 254 (labeled "restaurant 1") selected from the set of points of interest 112, as shown in FIG. 3. In one or more aspects, locations or places that do not qualify for selection based on user profile 118, regional profile 190, and/or other filtering criteria can be excluded from set of recommended locations 280 or other recommendation information 144. In one or more aspects, locations or places located outside profiled region 110, such as the illustrated features of whitewater rapids 276 and ski resort 278, can be excluded from the regional profile 190 and/or recommendation information 144, based on region parameters used to define or encompass profiled region 110.

Figure 4:
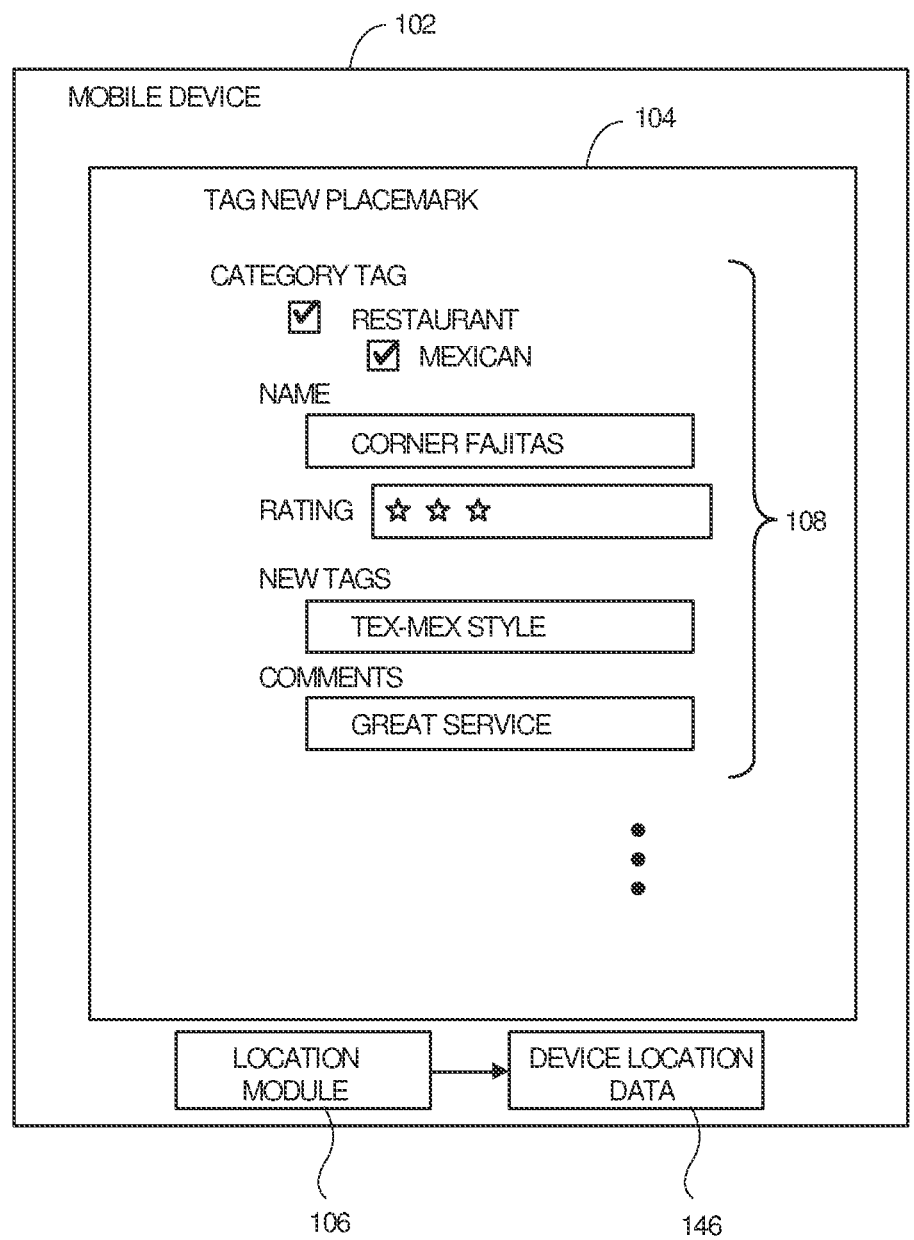
FIG. 4 illustrates an exemplary user dialog that can be used to enter user-supplied geotag and other data, according to one or more aspects.

In one or more aspects of the present teachings, and as for instance illustrated in FIG. 4, the exchange of various sets of geotag data 114 and associated information for a profiled region 110 can occur in both directions to and from mobile device 102, base station 106, and profiling server 170 with its associated resources. In one or more aspects, a user of mobile device 102 can therefore, in addition to receiving recommendation information 144 via recommendation selector 148 or other interface, likewise transmit or upload geotag information to base station 106 for inclusion in regional profile database 116. The set of geotag data 114 uploaded by the user of mobile device 102 can be registered and stored to regional profile database 116, incorporated in regional profile 190, and ultimately, in recommendation information 144 sent to the user him or herself as well as other users.

In one or more aspects as shown, a set of geotag inputs 108 received in or via mobile device 102 can include attributes or data be entered via a user dialog presented on user interface 104 of mobile device for a user traveling in, toward, or outside a profiled region. In one or more aspects as shown, a user can be prompted to add a new set of geotag inputs 108 to be incorporated in a set of geotag data 114, and ultimately uploaded to a base station 106 or other destination via a wireless interface, such as a cellular telephone or wireless data connection. In one or more aspects, the prompts can query or prompt the user to enter a new set of geotag data 114 (which can be referred as a tag, "place-mark," or other term) associated with a location captured by location module 106 and reflected in device location data 146. Device location data 146, as noted, can be or include for instance latitude/longitude coordinates reported by a Global Positioning System (GPS) fix, or other geographic or positional identifiers or data.

In one or more aspects as likewise shown in FIG. 4, set of geotag inputs 108 can include selectable category tags (illustratively shown as "restaurant" with a subcategory of "Mexican", or other categories/subcategories), a user-entered name for the geotag data, a rating dialog, a new tag(s) dialog to enter new or additional tag descriptors, selected categories, user-entered comments (regarding, e.g., service, location, quality, value, etc), and/or other attributes, fields or data. In one or more aspects, set of geotag inputs 108 can also or instead include other information than textual or numerical rating information, such as, for instance, audio data such as user voice annotations or audio samples from a location, video clips or data taken from a location, digital still images, or other content. Set of geotag inputs 108 can likewise include, for example, a link, comment, blog, or other information inputted by the user for the associated geographic location. Attributes included in set of geotag inputs 108 can also include the user's name, a time when the user visited the geographic location, and/or a time duration of the user's visit to the associated geographic location. In one or more aspects, attributes of these types can be stored in or with the set of geotag inputs 108 and resulting set of geotag data 114 as searchable data fields. When the mobile device 102 receives an indication that the set of geotag inputs 108 are ready to be stored, such as when the user submits the set of geotag inputs 108 via a keypad of mobile device 102, the mobile device 102 can upload those inputs and any associated data as a set of geotag data 114 to base station 106 and then profiling server 170, or other destination. Those inputs can be entered into regional profile database 116 via profile module 136 of profiling server 170 for incorporation in regional profile 190. In one or more implementations, the mobile device 102 can also or instead store the generated set of geotag data 114 directly in local storage or memory locate in mobile device 102 itself, or in other locations.

It may be noted that in one or more implementations, in terms of sharing set of geotag inputs 108 and other data with profiling server 170 or other resources, the user can be provided with a set of privacy controls to permit the user to share their location history and related data with desired individuals, such as designated friends. A user may be presented with options to filter the visibility of other geotag data, such as to restrict the display to relative distances rather than actual location, to restrict the display to mobility or behavior patterns (e.g., work until 6:00 pm) rather than actual location, applying time-based access rules, or enforcing other privacy or access privileges or restrictions.

Figure 5:
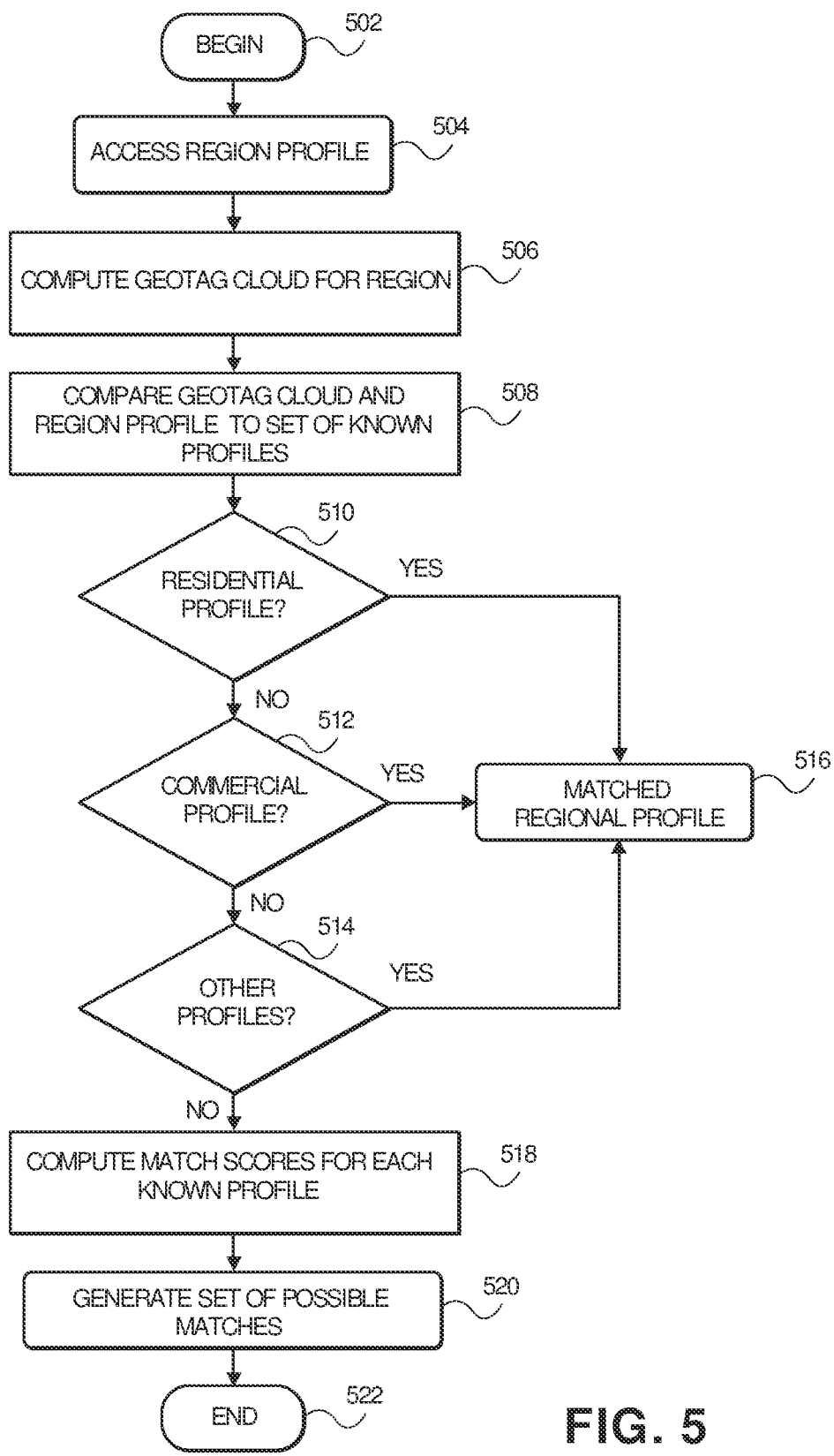
FIG. 5 shows an illustrative flow diagram for generating a regional profile, according to one or more aspects.

FIG. 5 illustrates a flow diagram of various analytic and discovery processes that can be used to generate regional profile 190 from which recommendation information 144 can be derived, according to one or more aspects of the present teachings. In 504, a regional profile 190 for a profiled region 110 can be created or accessed via regional profile database 116 or other data store or source. In 506, a tag cloud can be computed for profiled region 110, in which sets of fields or attributes in set of geotag data 114 can be identified and organized for the various locations in profiled region 110, along with the frequency of those fields or attributes. In 508, processing can be initiated to compare the resulting geotag cloud and/or other data in regional profile 190 associated with profiled region 110 to a list of known regional profiles. The list or collection of known regional profiles can contain frequencies and types of attributes contained in respective collective sets of geotag data 114 for regions of different overall type. For instance, known regional profiles can reflect a region whose attributes and related features generally relate to residential areas, commercial areas, resort areas, recreational areas, restaurant areas, nightclub or nightlife areas, and the like. A list or collection of known regional profiles can be retrieved from, hosted, or stored in regional profile database 116, or other local or remote data stores. In 510, a determination can be made whether profiled region 110 matches a known residential profile or template. The determination can consist of or include determining a frequency and/or threshold of different types of tags (e.g., at least 70% residential), or combinations of tags (e.g., residential plus home address). If the determination of 510 is yes, processing can proceed to 516 where profiled region 110 can be assigned a matched regional profile 190 indicating a residential categorization, after which processing can proceed to 512. If the determination in 510 is no, processing can proceed directly to 512. In 512, a determination can be made whether profiled region 110 matches a known commercial profile or template, using similar techniques. If the determination is yes, processing can proceed to 516 where profiled region 110 can be assigned a matched regional profile 190 indicating a commercial categorization, after which processing can proceed to 514. If the determination in 512 is no, processing can proceed directly to 514.

In 514, a determination can be made whether profiled region 110 matches any other known profile or template, using similar techniques. If the determination is yes, processing can proceed to 516 where profiled region 110 can be assigned a matched regional profile 190 indicating a corresponding further categorization, after which processing can proceed to 518. If the determination in 514 is no, processing can proceed directly to 518. In 518, profile module 136 can compute a set of match scores for each known profile against which the attributes of profiled region 110 is compared. For instance, matches can be rated on a scale of 0 to 1, or other ranges or confidence levels. In 520, a set of possible matches for regional profile types for profiled region 110 can be identified based on the match scores of 520. In one or more aspects, a match score threshold can be applied, for instance 90% confidence or other criteria, to assign a regional profile type to profiled region 110 and store that assignment to regional profile 190 in regional profile database 116. In 522, processing can repeat, return to a prior processing point, jump to a further processing point, or end. It may be noted that depending on match values or other factors, more than one overall type can be assigned to a profiled region 110.

Figure 6:
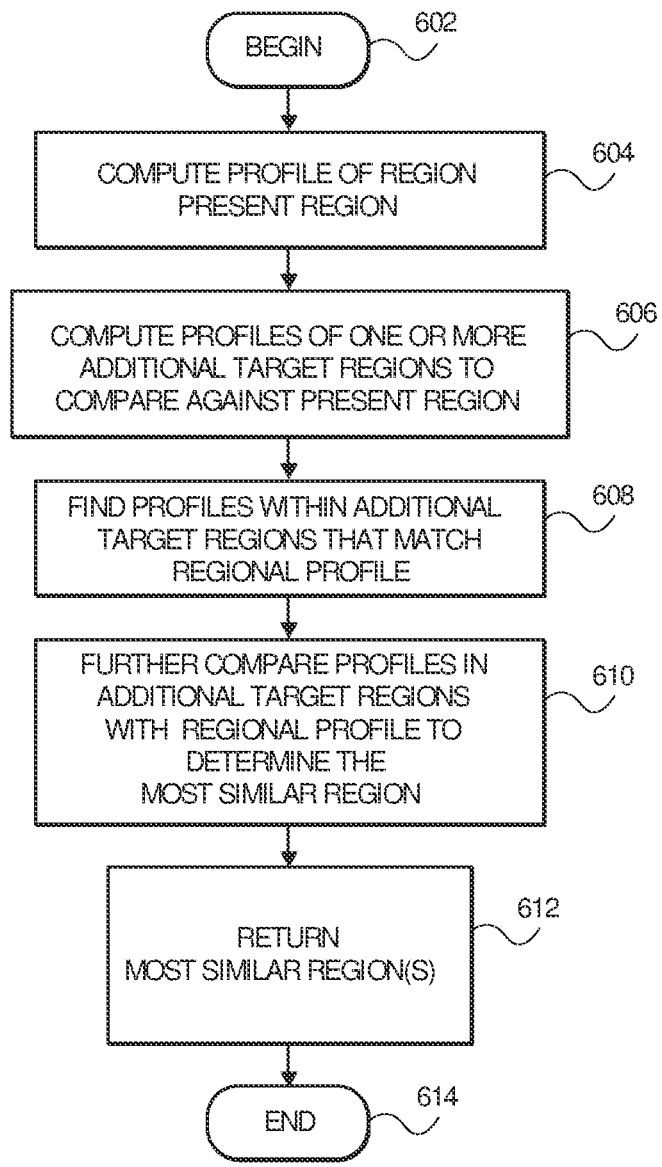
FIG. 6 shows an illustrative flow diagram for generating a similarity rating or recommendation for one region compared to another, according to one or more aspects.

In one or more aspects, once a regional profile 190 is developed and stored for a subject profiled region 110, in one or more aspects, profile module 136 can leverage the known characteristics of a given profiled region 110 to identify an additional region or regions that demonstrate a similar profile to the originally profiled region 110 of interest. FIG. 6 illustrates a flow diagram of processing for generating an identification of a similar region to a subject profiled region 110, according to one aspect. In 602, processing can begin. In 604, a regional profile 190 of a given profiled region 110 can be generated, for instance, using processing illustrated in FIG. 5 or otherwise. In 606, profile module 136 can compute the profile of one or more additional target regions to use to compare against the regional profile 190 of profiled region 110.

In 608, profile module 136 can locate one or more profiles within the one or more additional target regions to locate any regions that match the regional profile 190 of profiled region 110. In one or more aspects, matching can be performed by matching a minimum number of attributes or fields in the collective sets of geotag data 114 for locations in profiled region 110 against comparative regions in the set of identified additional target regions. For instance, two regions can be considered a high-level match if both are categorized as "residential" at the highest level of classification. In 610, profile module 136 can further compare the additional target regions to determine the most similar region or regions to profiled region 110 available. For instance, two regions classified as "residential' at the highest level can be further compared to identify the mutual presence of schools, libraries, parks, and/or other locations, places, or features. In 612, the most similar target region or region based on the comparative results can be returned as the most similar region(s) to the subject profiled region 110 whose regional likeness is being sought. In one or more aspects, the next-most similar, or other rankings or numbers of matched target regions can be returned. In 618, processing can repeat, return to a prior processing point, jump to a further processing point, or end.

In one or more aspects of the present teachings in further regards, besides executing a discovery process to locate similar regions on a regional level, the user of mobile device 102 may wish to locate or identify individual locations that exhibit similarity to each other, within the boundaries of a destination region. In this regard, the regional profile 190 of the region of the user's immediate vicinity, or other destination region, can be accessed to determine whether other locations or places reflect a similar set of characteristics. For instance, if a user is experiencing a long wait at a pub in London, England, and would like to locate a similar establishment nearby, the user of mobile device 102 can request a list or map of "places like here" displaying similar attributes within the metropolitan area. The similar locations can be restricted to destination regions within next-nearest streets, blocks, towns, or other geographic distances or areas. The results for similar locations can be filtered by additional factors such as a user profile 118, profiles, or current locations of friends or members of other social groups, or other criteria.

Figure 7:
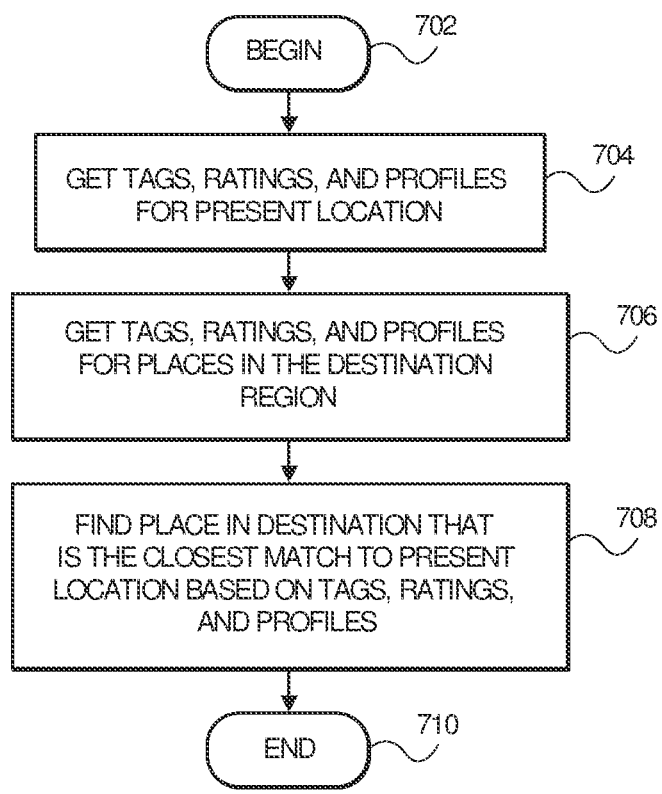
FIG. 7 shows an illustrative flow diagram for generating a similarity rating or recommendation for one location or place compared to a current location, according to one or more aspects.

FIG. 7 illustrates a flow diagram of processing to locate similar locations within a profiled region 110. In 702, processing can begin. In 704, one or more set of geotag data 114 including tags, ratings, profiles, and other fields or data for a present location or place in a profiled region 110 can be retrieved, for instance, from regional profile database 116. In 706, the collective sets of geotag data 114 including tags, ratings, profiles, and other fields or data for additional locations or places for a destination region can be retrieved, also for instance from regional profile database 116. In one or more aspects, the destination region can be the profiled region 110 in which the user is currently located.

In 708, profile module 136 can find or identify one or more location or place in the destination region that represent the closest match to the current location, based on tags, ratings, profiles, or other fields or data for each candidate location compared to the same or similar attributes for the current location. In one or more aspects, profile module 136 can transmit the most similar place to the current location to mobile device 102 or other client or destination as recommendation information 144. In 710, processing can repeat, return to a prior processing point, jump to a further processing point, or end. According to one or more aspects in some regards, a user who finds that they enjoy or appreciate a current location or site can thereby receive recommendation information 144 suggesting other locations of similar type within profiled region 110, among other outputs. It may be noted that in one or more aspects, initiation of similar-location processing can be initiated by request of user of mobile device 102, by profile module 136 on a predetermined or event-triggered basis, or based on other events or conditions.

Figure 8:
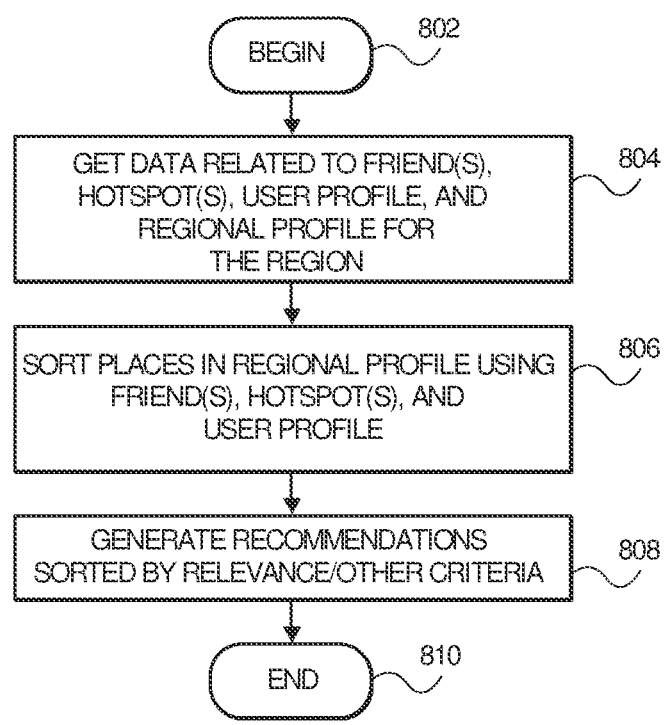
FIG. 8 shows an illustrative flow diagram for generating a recommendation of a destination or where to go for a user, according to one or more aspects.

In one or more aspects of the present teachings, in certain regards, a user of mobile device 102 may request a suggestion or recommendation of where to go within a profiled region 110 from profile module 136 of profiling server 170, or other logic. FIG. 8 illustrates a flow diagram of processing to identify a recommendation for a location to visit or frequent in profiled region 110. In 802, processing can begin. In 804, profile module 136 can access a set of data for discriminating a suggested location to visit, including a set of hotspots for friends in profiled region 110, and a set of hotspots for friends in profiled region 110 filtered based on time of day, hotspots for the overall community of profiled region 110, and hotspots for overall community of profiled region 110 filtered by time of day. The set of data can likewise include a user profile 118 for the user of mobile device 102 including designated favorite places, profiles of friends of the user of mobile device 102 including designated favorite places, and regional profile 190 for the subject profiled region 110. In one or more aspects, profiles or other data for friends or other associates of the user of mobile device 102 can be acquired via a social networking service, including ratings, recommendations, location histories, and other information for the user's friends or other social group.

In terms of generating hotspot data, one or more hotspots in a profiled region 110 can be generated by profile module 136 by identifying which locations within profiled region 110 have been visited or rated by users within a predetermined period of time, such as the last week, last month, or other period. In one or more aspects, it may be noted that profiling server 170 can maintain or serve a list or map of hotspots and popular locations, based on the regional profile database 190. In one or more implementations in this regard, the profile module 136 can determine a distribution of all user locations at a given time or interval. For example, the profile module 136 can determine that it is 6:00 pm, and the user is currently within a given profiled region 110, such as within ZIP code 95008. The profile module 136 can determine that at that time, the distribution of all users of mobile devices registered to the server network is 50% downtown, 20% at home, 10% at a public pavilion, 10% at a shopping mall, and 10% unknown. In one or more aspects, details can be zoomed at a particular location to determine a reason for a population of users congregating within a profiled region 110, for example a public concert in a park or other area. The distribution of locations can be filtered by or analyzed in terms of time-of-day or other scheduling bands, such as lunch time, dinner time, commute time, or other intervals of common activity. Day of week, month of year, holiday, or other information can also be used to inform the analysis of collective user positions. Again, social group profiles and personal preferences can also be used to filter hot spot or popular location hits.

Returning to the processing flow, in 806, profile module 136 can match or sort a set of locations or places in the regional profile 190 of the profiled region 110 using the profiles of the user's friends, hotspot ratings, or data, set of geotag data 114 for regional profile 190, and/or user profile 118. For instance, profile module 136 can identify those locations in profiled region 110 whose overall relevance or potential level of interest to the user are the greatest, next-greatest, and so forth in order. Overall relevance can be determined, for example, by rating or weighting the number of matches in set of geotag data 114 for each candidate location against the profile, hotspot, or other comparative attributes. In 808, profile module 136 can generate a set of recommendation information 144, sorted by degree of relevance, to transmit to the user of mobile device 102. For instance, recommendation information 144 can include a list of Mexican restaurants most frequently visited and/or most highly rated by the user's set of friends, by other users at large in the community, most visited by the user in the past, or based on other criteria. In 8120, processing can repeat, return to a prior processing point, jump to a further processing point, or end.

Figure 9:
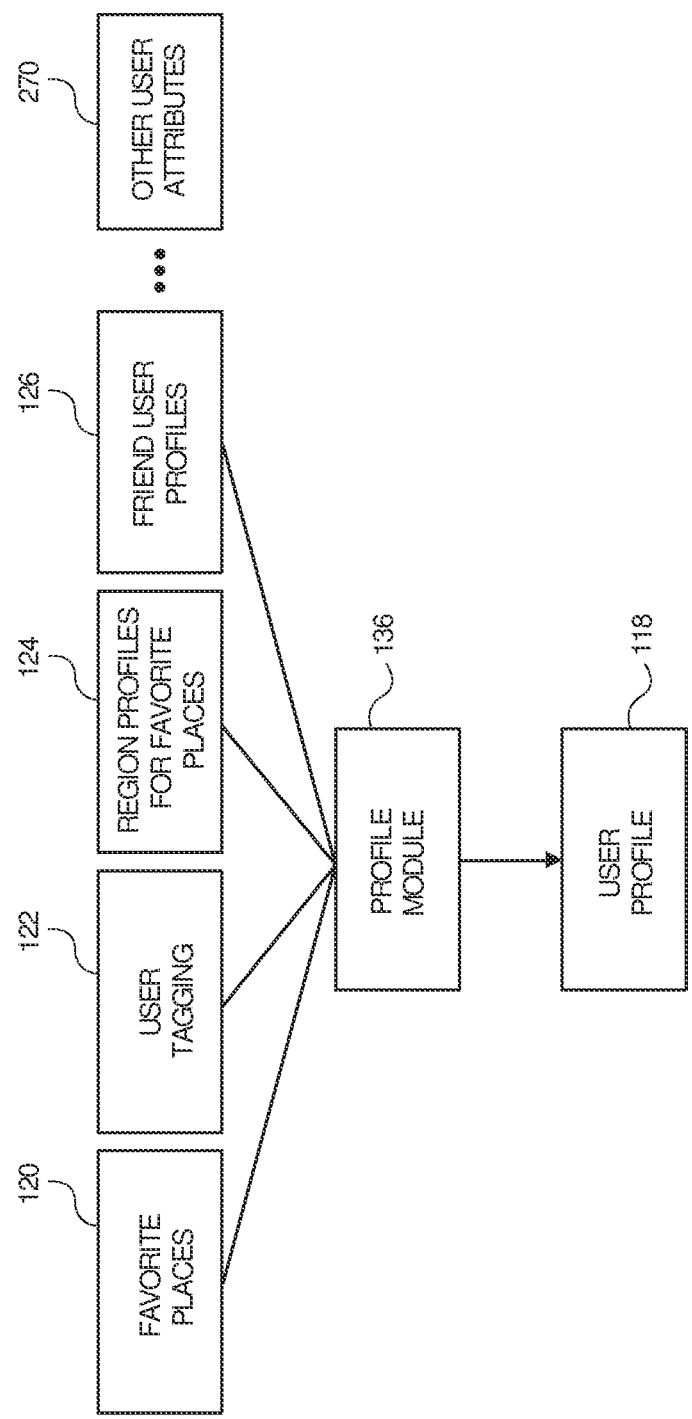
FIG. 9 shows an illustrative diagram for generating a user profile from various user attributes, according to one or more aspects.

In terms of generating a user profile 118 for use in discovery or searching against the set of geotag data 114 stored in regional profile 190, as noted, a variety of user-supplied and/or network-generated data can be used to develop a set of preferences, selections, histories, and/or other data to build user profile 118 for a user of mobile device 102. FIG. 9 illustrates a variety of sets of user-related data that can be accessed or received as inputs by profile module 136 to generate and output user profile 118. Those inputs, as illustratively shown, can include a set of favorite places 120 associated with the user. Set of favorite places 120 can include places which the user explicitly enters or designates as favorite locations, and in addition or instead can include locations identified through analysis of the location history or other records of activity for that user. The inputs, as likewise illustratively shown, can include user tagging data 122 indicating tags or other inputs that the user has supplied as part of one or more set of geotag data 114 for locations in the past. For instance, a user who frequently inputs or uploads ratings of golf courses or pro shops can be inferred to have a greater than average interest in golf activities, and user profile 118 can include a category tag of "golf" for potentially favorite locations.

The inputs to a user profile 118, as similarly shown in FIG. 9, can also include the regional profile 190 for any one or more profiled region 110 in which the user has designated a favorite location or place. The inputs to user profile 118, as likewise shown, can also include a set of friend user profiles 126 for a set of friends for the user. In one or more aspects, those profiles or other data can be imported or received form a social networking service. In one or more aspects, a set of other user attributes 270 can likewise be incorporated into the inputs to profile module 136 to generate user profile 118. It may be noted that In one or more aspects, different inputs accepted by profile module 136 to generate user profile 118 can be weighted or used differently, for instance, based on the differing predictive power of various inputs. Thus, in one or more aspects, prior location or transaction history for the user of mobile device 102 can be accorded greater weight than the same histories of users in set of friend user profiles 126. User profile 118 can, again, include data indicating favorite locations for the user, a location or transaction history for the user, category tags for areas or activities of interest to the user, and/or other data. In one or more aspects, profile module 136 can update user profile 118 at various times, such as at predetermined intervals, or based on triggering events such as user entry of new geotag data. In one or more aspects again, user profile 118 can in addition or instead include data or preferences entered directly by the user.

Figure 10:
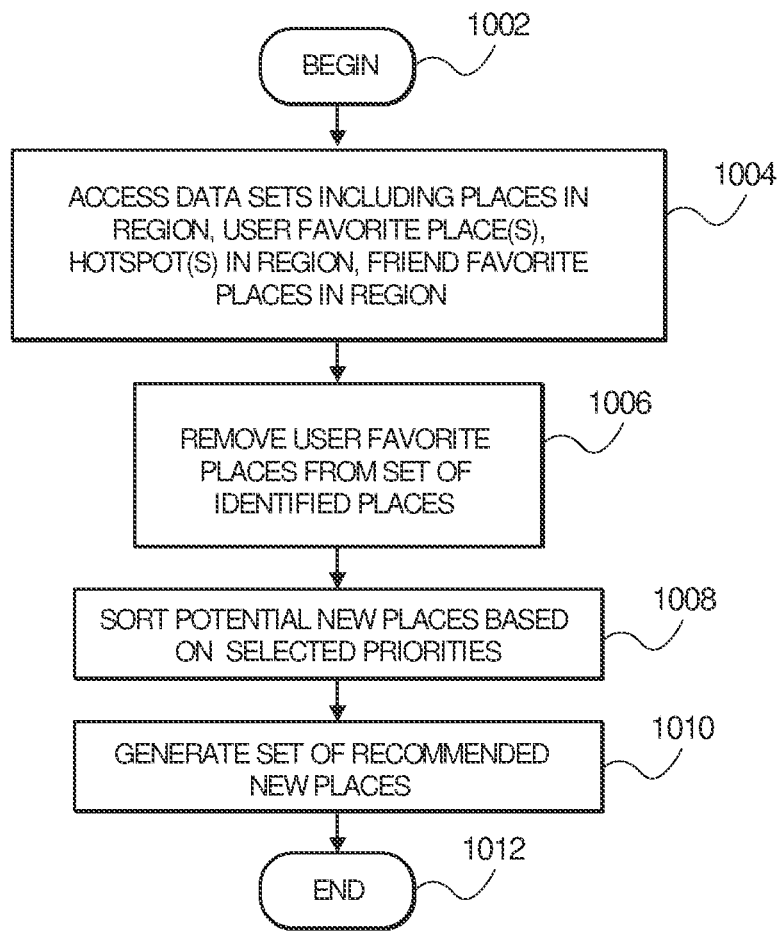
FIG. 10 shows an illustrative flow diagram for generating a recommendation for a new place or location to a user, according to one or more aspects.

In one or more aspects of the present teachings in further regards, the user of mobile device 102 can request and/or profile module 136 can determine a set of recommendations for one or more new places for the user to visit in a profiled region 110. That is, the user can request and/or the profiling server 170 on a predetermined basis can decide to generate a set of previously unvisited locations for the user to receive as potential sites of interest to the user. FIG. 10 illustrates a flow diagram of processing to identify potential new places of interest for a user to visit or frequent. In 1002, processing can begin. In one or more aspects, processing to generate a recommendation of a new place for the user to visit can be initiated, for instance, via a user-initiated request and/or initiation by the network. In 1004, profile module 136 or other logic can access data sets to develop suggested new places. Those data sets as shown can include a list of locations or places in a profiled region 110, any designated user favorite places in profiled region 110 or elsewhere recorded in user profile 118 or other record, any identified hotspot(s) in profiled region 110 including friend-based or community-wide hotspots, any favorite locations designated by friends of the user such as social networking members and places tagged or recommended by them, and/or other data associated with a profiled region 110.

In 1006, profile module 136 can remove any locations or places which the user has already designated as a favorite place in user profile 118 or otherwise, to ensure any suggested locations represent new or previously unvisited places to the user. In 1008, the set of remaining places can be sorted by profile module 136 or other logic based on selected priorities or weightings used to order the resulting set of potential new places. For instance, places displaying a higher hotspot rating by members of the user's social networking service can be given greater weight than community-wide hotspots. In one or more aspects, the sorting of potential new places can likewise be adapted based on time of day information. In 1010, a set of new recommended places can be generated as part of a set of recommendation information 144 to be transmitted to mobile device 102 or otherwise. In 1012, processing can repeat, return to a prior processing point, jump to a further processing point, or end.

Figure 11:
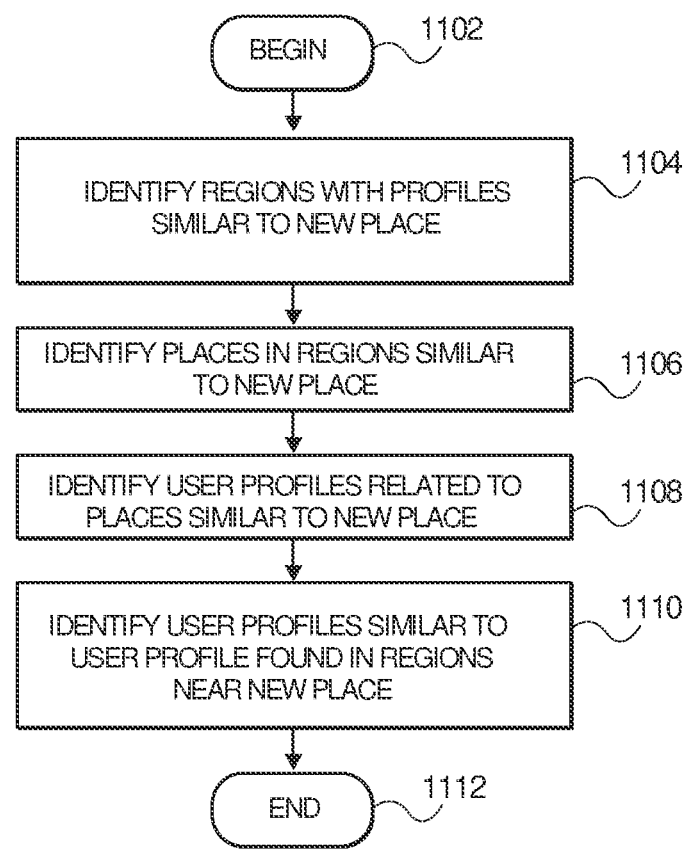
FIG. 11 shows an illustrative flow diagram for generating a recommendation of a set of new user profiles most likely to visit an identified new place, according to one or more aspects.

In one or more aspects of the present teachings in still further regards, besides including potential new places in recommendation information 144, profile module 136 can leverage the information contained in regional profile 190 to develop user profiles to recommend or present to an existing user, business operator, marketing organization, or others, using linkages or similarities to attributes of recommended new locations for the user(s). One feature of this type of recommendation is that it permits an identification of users who may be more likely to visit a location. FIG. 11 illustrates a flow diagram of processing to develop recommendation information 144, including user profiles affiliated or linked with one or more profiled region 110. In 1102, processing can begin. In 1104, profile module 136 can identify one or more additional profiled region 110 having an associated regional profile 190 that matches, is similar to, or otherwise correlated with a recommended new location or place. In one or more aspects, a suggested new location in 1104 can be identified using processing illustrated in FIG. 10, or other techniques. For instance, if the new location is an oceanside recreational area such as a beach or boardwalk, profile module 136 can locate one or more additional profiled region 110 that contains a tag "ocean" in set of geotag data 114 or otherwise indicates oceanside sites in the respective points of interest 112.

In 1106, profile module 136 can identify individual locations or sites within each additional profiled region 110 that contain similar attributes to the identified new location. In one or more aspects, profile module 136 can search the set of geotag data 114 for locations in each of the one or more additional profiled region 110 that matches attributes of the new location, such as a tag containing "surf park." In 1108, profile module 136 can identify one or more user profile 118 associated with the matching locations that correspond to or match the attributes of the new location. Thus for instance, user attributes, preferences, or other tags or data that indicate an interest in "snorkeling," "surfing," "sailing" and so forth can be identified as matching or related to new location that is an oceanside recreational area. In 1110, profile module 136 can identify a subset of the one or more user profiles 118 generated in this fashion that match or correspond to user profile 118 for the user to whom the new location was recommended. For instance, attributes that match in favorite locations, preferred interests, and the like can be used to identify one or more user profile 118 that is similar to that of the user of mobile device 102 receiving a recommendation of a new location. In one or more aspects, the one or more user profile 118 that is identified as similar can for instance be transmitted or presented to a business operator whose location relates to the matching attributes. In one or more aspects, the information can be transmitted to the user of mobile device 102, for instance to extend invitations to social networks or import favorite locations or other attributes related to set of geotag data 114. In 1112, processing can repeat, return to a prior processing point, jump to a further processing point, or end.

According to one or more aspects in yet further regards, it may be noted that in general, set of geotag data 114 associated with a place or location, region, or other geographic area can be encoded in a variety of forms, including in the form of speech samples or annotations, or other audio data supplied by a user related to a location or region. In one or more implementations, the speech input can require the user to use a defined vocabulary of input words or terms. In one or more implementations, the mobile device and/or the geotag server can also determine commonly used geotag vocabulary by the user or a group of users, to train and improve speech recognition capability. In one or more implementations, the speech processing used to extract geotag information can rely upon natural language processing to automatically extract intended tag or other information from unrestricted speech patterns. In one or more implementations, the speech pattern of a given user and/or other users, as well as patterns in tags surrounding the subject location be tagged can be analyzed, to dynamically create a recognition grammar. In one or more implementations, these types of dynamically generated grammar can be generated for each recognition request.

Figure 15:
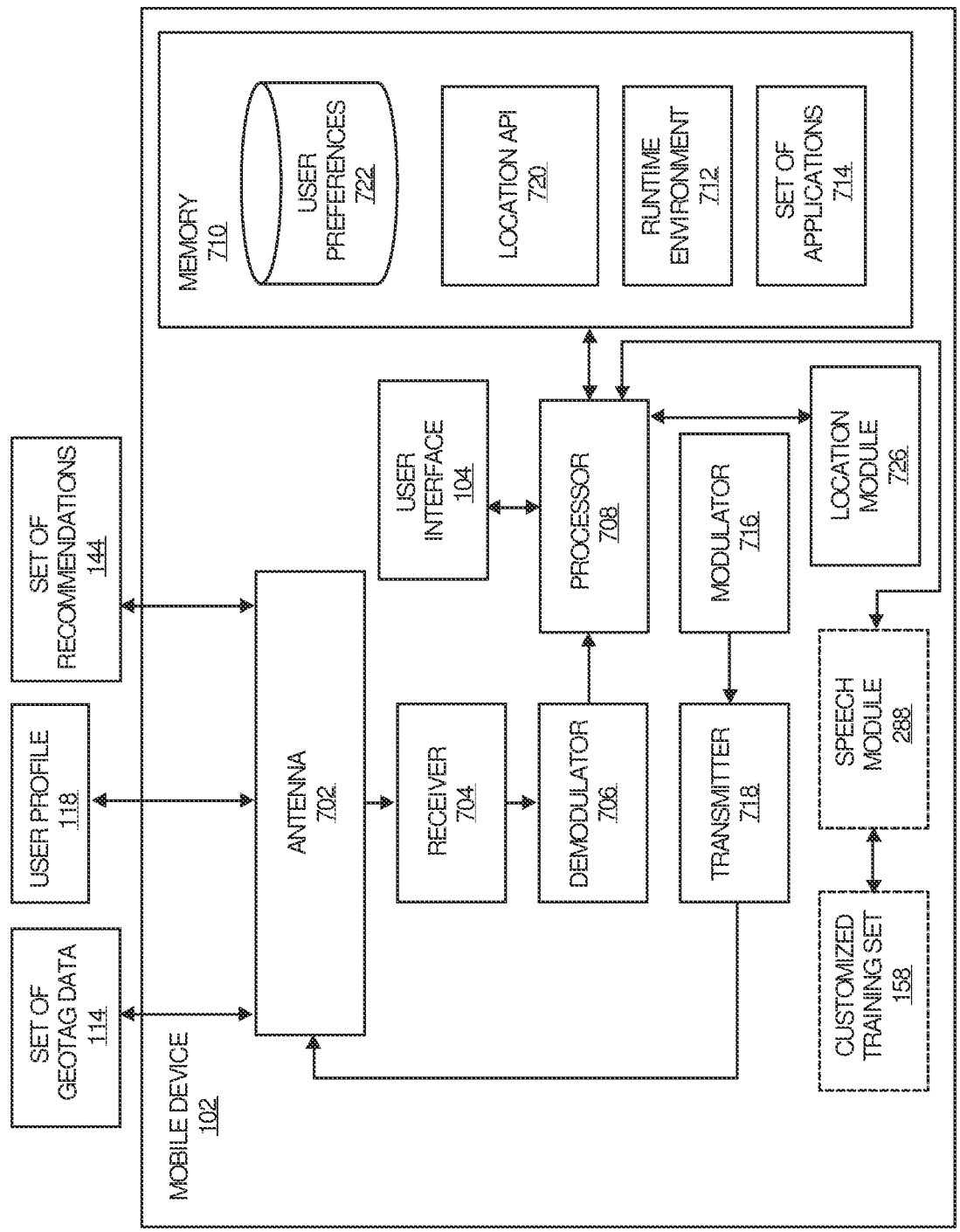
FIG. 15 illustrates an exemplary set of hardware and other resources in a mobile device, according to implementations of the present teachings.
Figure 16:
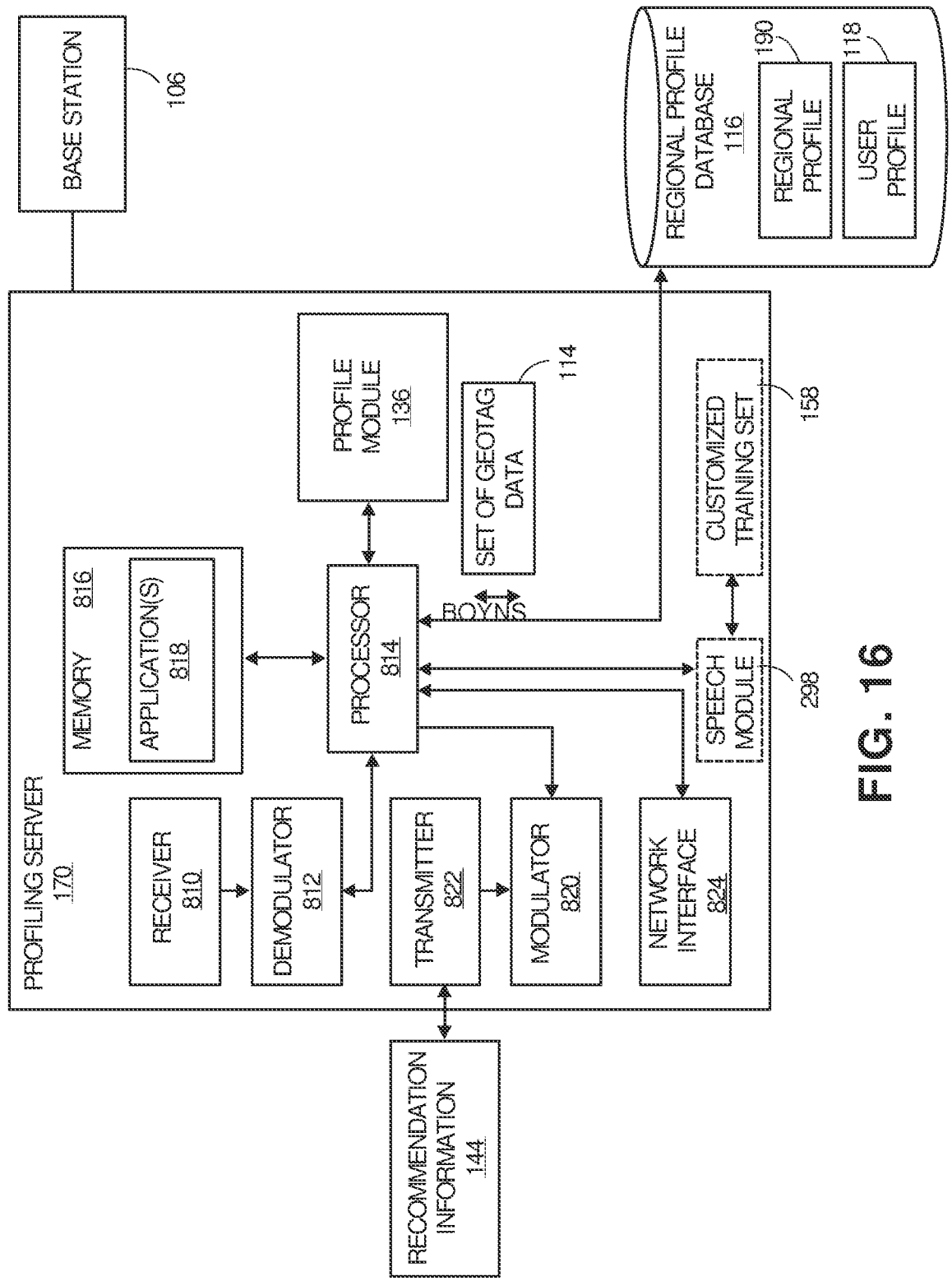
FIG. 16 illustrates an exemplary set of hardware, software, and other resources in a profiling server and associated components, according to implementations of the present teachings.

For instance, a user visiting a national park may activate a voice recording feature on their mobile device 102, and speak into the device to record remarks, tags, or other data, such as "clear ocean view" or "large camping facilities." In one or more aspects in these regards, profile module 136, mobile device 102, and/or other hardware or other resources can be equipped with speech processing circuitry and/or logic to capture and analyze voice, speech, or audio content as part of set of geotag data 144. In one or more aspects (for example as shown in FIG. 15 described below), mobile device 102 can be equipped with a speech module 288 for these and other purposes. In one or more aspects (for example as shown in FIG. 16 described below), profiling server 170 can also or instead be equipped with a speech module 298 for these and other purposes.

Figure 12:
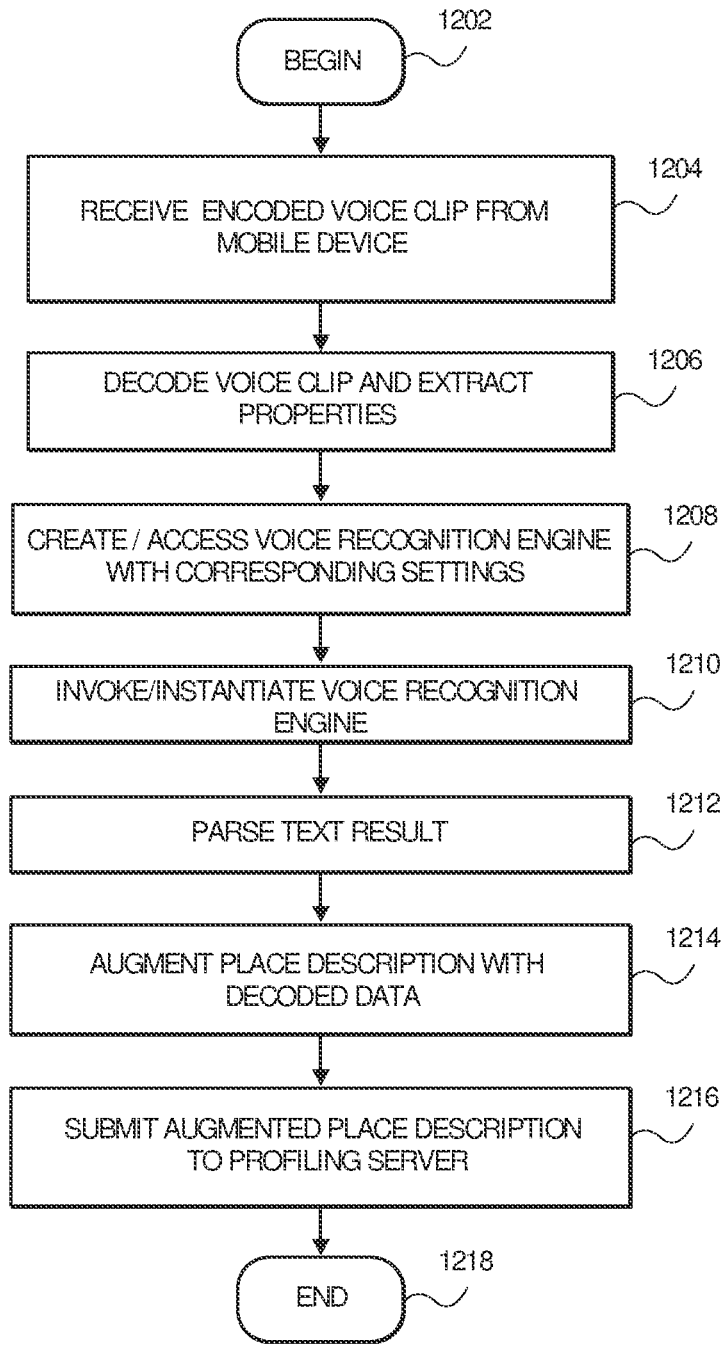
FIG. 12 shows an illustrative flow diagram for voice analysis of geotag data in various regards, according to one or more aspects.

FIG. 12 illustrates a flow diagram of processing to analyze and add voice-annotated tags, comments, or other data as part of set of geotag data 114 in regional profile database 116, according to one or more implementations. In 1202, processing can begin. In 1204, an encoded voice clip can be received from or via mobile device 102. In one or more aspects, voice data can be received along with additional attributes such as a profile name for a regional profile 190 and/or other profile or data record. In one or more aspects, the corresponding encoded voice clip or sample can be received in profile module 136 of profiling server 170 via speech module 298, in a processor or storage of mobile device 102 itself, via speech module 288, or in other processor, memory, or storage resources. In one or more aspects, the encoded can be recorded in a variety of media formats or encoding schemes, such as pulse code modulated (PCM), MP3 (Motion Pictures Expert Group Layer 3), or other format. In 1206, the encoded voice clip can be decoded and properties of the voice clip can be extracted. For instance, the sampling rate (e.g. 44.1 kHz), number of channels (e.g. mono or stereo), bits per sample (e.g. 16 bits), compression techniques, dithering settings, and/or other configuration details for the audio sample can be registered or identified.

In 1208, a voice recognition engine, audio codec, or other speech module can be created, accessed, and/or reused with corresponding settings as those detected in 1206 (e.g., sampling rate, number of channels, bit depth, and so forth). In 1210, the voice recognition engine, audio codec, or other speech module can be invoked or instantiated, for instance, by initiating software programming in profiling server 170. In 1212, the text result produced by executing speech recognition against audio clips or samples inputted in set of geotag data 114 can be parsed, for instance to extract tags, categories, comments, sentences, and/or other linguistic or textual output. In 1214, the place description of a location or place in a set of points of interest 112 in a profiled region 110 associated with the voice annotation can be augmented to reflect the decoded voice data. For instance, the set of geotag data 114 associated with a given place, location, or region can be augmented by data fields such as the user's name, any tags the user has assigned to the data, any user ratings contained in the speech input, comments identified in the speech input, and/or other fields or data. In 1216, the augmented place description containing the user-supplied spoken attributes can be submitted or transmitted to profiling server 170 as part of a set of geotag data 114, for instance for incorporation in regional profile 190. In one or more implementations, the voice or audio sample itself can be stored to regional profile database 116, for instance for potential replay, if desired. In 1218, processing can repeat, return to a prior processing point, jump to a further processing point, or end.

In terms of performing speech recognition during processing shown in FIG. 12 or otherwise, in one or more aspects, speech module 288, speech module 298, profile module 136, or other logic can employ specialized speech recognition to more accurately or efficiently identify tags and other attributes in set of geotag data 114 supplied by a user of mobile device 102. More particularly, speech module 288 in mobile device 102, speech module 298 in profiling server 170, or other logic can access speech training sets that are associated with a profiled region 110 and/or one of its constituent locations, to generate a customized training set 158 (as shown e.g. in FIG. 15 and FIG. 16 when hosted in mobile device 102 and profiling server 170, respectively) that allows greater recognition of potentially significant tags, words, or other terms or speech components.

Figure 13:
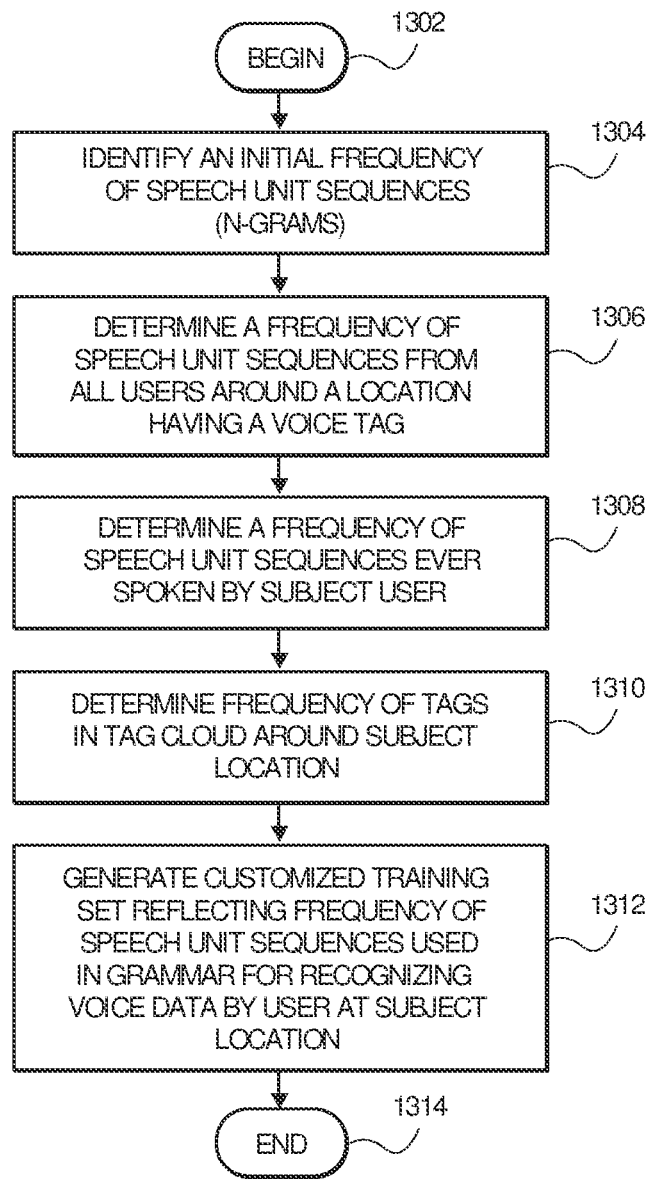
FIG. 13 shows an illustrative flow diagram for constructing a customized training set for voice recognition related to geotag data, according to one or more aspects.

In one or more aspects in these regards, FIG. 13 illustrates a flow diagram of processing that can be used to identify voice tag data using customized or specialized training sets for voice recognition. In 1302, processing can begin. In 1304, a voice recognition engine, audio codec, or other speech module, for instance in profiling server 170 and/or in mobile device 102, can initiate speech recognition processing by identifying an initial frequency of speech unit sequences for use as a speech decoding dictionary, such as an ordered set of N-grams. In one or more aspects, the speech unit sequences can consist of an N-gram, or a set of words which appear in a given order, such as "Mexican restaurant within 10 miles." In 1306, a frequency of speech unit sequences can be determined for all users around a location having a voice tag contained in set of geotag data 114. In 1308, a frequency of speech unit sequences can be determined for speech samples ever spoken by the subject user. In 1310, a frequency of tags in a surrounding area (or tag "cloud") associated with a specific subject location can be determined. For example, a given location in profiled region 110 with defined latitude/longitude coordinates (or, latitude/longitude/altitude coordinates) can have the term "golf" appearing in the associated set of geotag data 114 with a frequency above a predetermined threshold.

In 1312, a customized training set 158 can be generated reflecting the frequency of speech unit sequences to be used in a grammar for recognizing voice data elements supplied by the user at the subject location of interest, based on the frequencies calculated or identified in the speech unit sequences of 1304-1310. In one or more aspects, the various speech unit sequences can be given different weights or values for speech recognition purposes. For instance, speech unit sequences extracted from the user him or herself can be given greater weight relative to any initial or default frequencies, and/or relative to sequences of other users. The customized training set 158 can provide a more accurate and more efficient set of speech unit sequences and resulting word recognition, as a result. In 1314, processing can repeat, return to a prior processing point, jump to a further processing point, or end. In one or more aspects, the customized training set 158 generated as described can be updated, for instance on a regular or event-triggered basis.

Figure 14A:
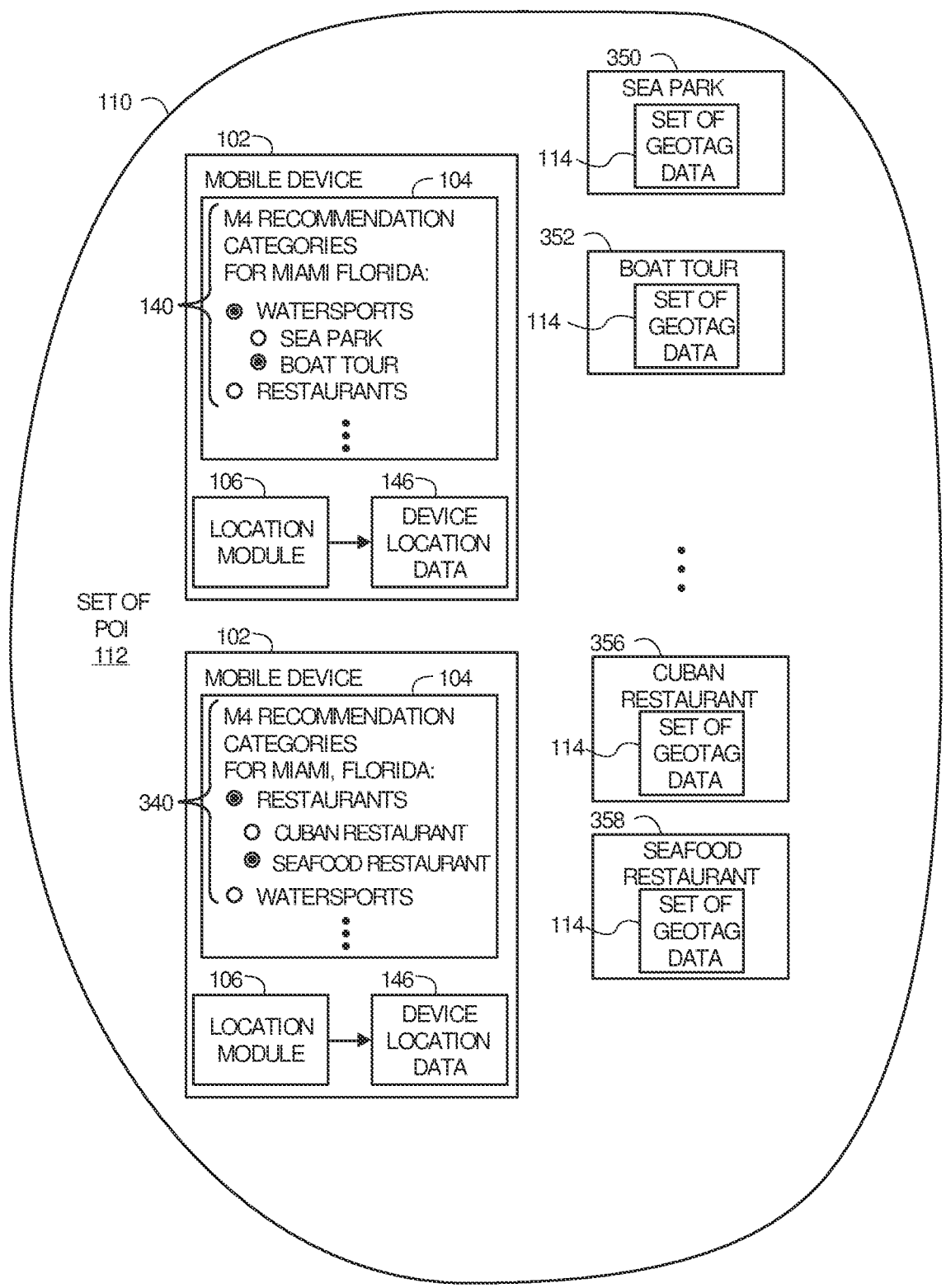
FIGS. 14A and 14B show illustrative recommendation views including dynamically reordered menu elements for users in the same location and a user traveling to different locations, respectively, according to one or more aspects.

As described herein, one type of output produced by the regional profiling activity carried out by profile module 136 on set of geotag data 114 and other information can be or include a set of recommendation information 144, reflecting a matching of potential user interests and features or attractions in a profiled region 110. In one or more aspects of the present teachings in further regards, and as for instance illustrated in FIGS. 14A and 14B, profile module 136 can generate a dynamically ordered menu (e.g. shown as 140 and 340 in FIG. 14A, and 140 in FIG. 14B), or other adaptive representation of recommendation information 144. Dynamically ordered menu 140 (or 340) can present categories of recommendation information 144 based on the user profile 118 of the user of mobile device 102, and/or other filters or criteria. In one or more aspects as shown, for instance, in FIG. 14A, recommendation information 144 can be received in mobile device 102 of a first user and mobile device 302 of a second user, both located in the same location in a profiled region 110. In one or more aspects as shown, the recommendation information 144 generated for the respective users of the two devices can be presented to those users via user interface 104 and 304 in the form of a (first) dynamically ordered menu 140 and (second) dynamically ordered menu 340, respectively. In one or more aspects, profile module 136 or other logic can process recommendation information 144 to apply logic to the presentation order of recommended locations or other data for each user. The order of categories of other selections or data in (first) dynamically ordered menu 140 and (second) dynamically ordered menu 340 or other dialog can, for instance, be, based on their respective user profiles 118 or other data to generate the two separate lists appearing in dynamically ordered menu 140 and dynamically ordered menu 340 presented to each respective user.

In one or more aspects as shown, even though both users or located in the same or substantially same location or place (illustratively, the city of Miami, Fla.) having the same surrounding set of points of interest 112, the dynamically ordered menu 140 for the first user can present a different set of categories for selection compared to the dynamically ordered menu 340 for the second user. Again as illustratively shown, if the user profile 118 of the first user for instance indicates a preference for watersports or related sites or activities, the first category of recommended sites contained in dynamically ordered menu 140 can be watersports, which can include or expand into locations such as a sea park 350 and boat tour 352. The first or preferred category for that user can be followed by a second category, illustratively restaurants. Conversely, and as likewise shown, if the user profile 118 of the second user for instance indicates a preference for restaurants, the first category in dynamically ordered menu 340 for that user can include or expand into locations such as a Cuban restaurant 356 and seafood restaurant 358, followed by a category for watersports, and so forth.

In one or more aspects, the dynamically ordered menu 140 and dynamically ordered menu 340 can be adapted based on other factors in addition to or instead of user profile 118 coupled with regional profile 190, such as, for instance, the current location or presence of friends in a social networking group within profiled region 110, current or expected weather conditions that may affect preferred activities or sites, or other variables or criteria. For instance, In one or more aspects dynamically ordered menu 140 or dynamically ordered menu 340 can be sorted or reordered based on scheduling factors such as time of day, day of week, or month of year, with recreational recommendations for instance taking precedence or receiving greater weight during weekend or holiday periods as compared to business working days.

Figure 14B:
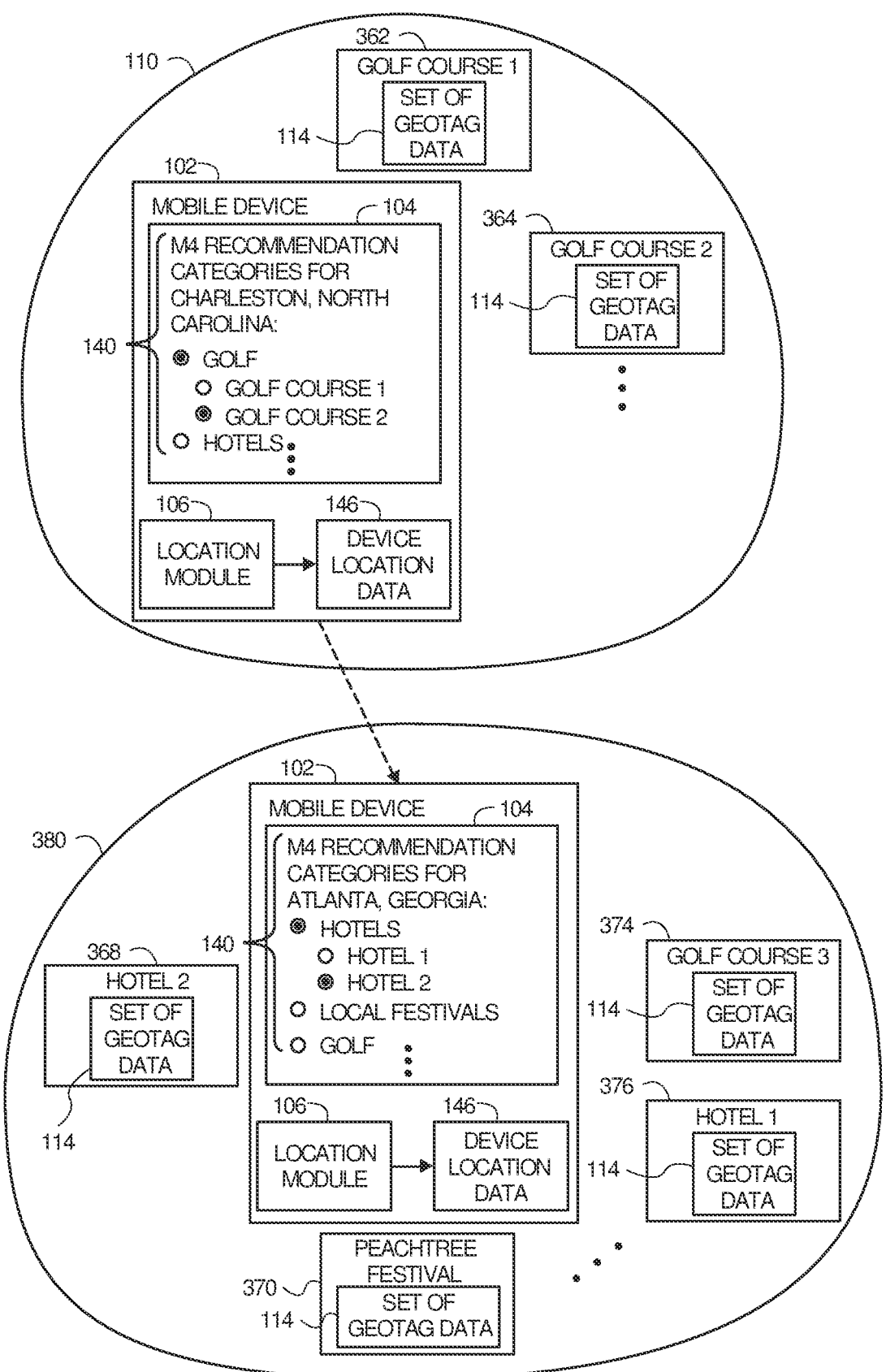

Likewise, and as shown for instance in FIG. 14B, in one or more aspects, dynamically ordered menu 140 can be ordered in different ways for the same user of mobile device 102 as that user travels from a first profiled region 110 to an illustrative second profiled region 380. In one or more aspects as shown, while located in profiled region 110, illustratively indicated as the city of Charleston, S.C., the dynamically ordered menu 140 can list a first category of golf, which can include or expand into golf course 362 (illustratively labeled "golf course 1") and golf course 364 (illustratively labeled "golf course 2"), followed by a second category of hotels. The dynamically ordered menu 140 for that location can be filtered by user profile 118 including, for instance, tag or preference data indicating an interest in golf sites and local accommodations. After traveling to a second profiled region 380, illustratively indicated as the city of Atlanta, Ga., the dynamically ordered menu 140 for the same user can list a set of categories for recommended places include a category of hotels which can include or expand into hotel 376 (illustratively labeled "hotel 1") and hotel 374 (illustratively labeled "hotel 2"), followed by categories for local festivals, golf, and so forth. In one or more aspects, the categories of recommendation information presented in dynamically ordered menu 140 for the same user at the second location can indicate a different set, order, or sequence of recommendations, based on user profile 118 or other criteria. For instance, user profile 118 can indicate that a user preference for golf courses, but that the user ranks those of first interest only if the available courses exceed 5000 yards in length, or satisfy other criteria. Other variables can be used to generate categories or other user selections in dynamically ordered menu 140 for the same user in the same or different places, including, for example, time of day, day of week, month, or other time or other schedule-related information.

FIG. 15 illustrates an exemplary configuration of hardware, software, and other resources of a mobile device 102, consistent with one or more implementations of the present teachings. Mobile device 102 can include at least one antenna 702 (e.g., a transmission receiver or group of such receivers comprising an input interface, etc.) that receives a signal (e.g., pertaining to a mobile call initiation or other handshake, a handshake response, a mobile application data transfer, a data event, data event response, handshake termination, and so on) and a receiver 704, which performs actions (e.g., filters, amplifies, down-converts, etc.) on the received signal. Antenna 702 can be further coupled to a transmitter 718 to transmit signals. Antenna 702 can for example transmit or receive a response to a handshake request, data event request, or the like. Transmitted signals can be or include a set of location fixes 130, and other data, as described herein. Antenna 702 and receiver 704 can also be coupled with a demodulator 706 that can demodulate received signals and provide the demodulated information to a processor 708 for processing. Mobile device 102 can additionally include memory 710 that is coupled to processor 708 and that can store data to be transmitted, received, and the like.

Processor 708 can analyze information received by antenna 702 and/or a user interface 104 of the mobile device 102 and/or generate information for transmission by a transmitter 718 via a modulator 716. Additionally, processor 708 can control and/or access one or more resources or components (e.g., 706, 712, 714, 716, 718) of the mobile device 102. Processor 708 can execute a runtime environment 712, such as BREW® available from Qualcomm Incorporated, as well as one or more set of applications 714 or other software, modules, applications, logic, code, or the like. Processor 708 can communicate with a location module 106, such as a Global Positioning System (GPS) module or chip, to receive and process location-related information, including device location data 146. Processor 708 can further communicate with a location API (Application Programming Interface) 720 to execute function calls to extract location information, regional profile data, and generate recommendation information according to the present teachings. In one or more implementations, mobile device 102 can optionally incorporate a speech module 288 such as a digital to analog (DAC) chip, digital signal processing chip, software applications, and/or other resources to process speech input and other audio data. When present, processor 708 can also communicate with a speech module 288 to process audio samples and other data. Processor 708 can likewise couple with user interface 104, such as a graphical user interface or other graphical display, to display graphics, video, location-based information including recommendation information 144, and other information.

FIG. 16 illustrates an exemplary set of hardware, software, and other resources that can be incorporated in, maintained by, or associated with profiling server 170, and associated network resources and components, according to various implementations. Profiling server 170 can include, access, or communicate with a receiver 810 that receives signal(s) from one or more mobile device 102 through a plurality of receive antennas 806, and a transmitter 822 that transmits to the one or more mobile device 102 through a transmit antenna 808. Receiver 810 can receive information from receive antennas 806 and be operatively coupled with a demodulator 812 that demodulates received information. A processor 814 can analyze demodulated signals provided by demodulator 812. The processor 814 further couples to a memory 816 that can store one or more application 818 that can execute, support, facilitate and/or participate in communication and profiling activities as described herein. Processor 814 can likewise couple with a profile module 136 to capture, manage, store, and transmit device location data 146, recommendation information 144, and other information, as described herein. In one or more implementations, profiling server 170 can optionally incorporate a speech module 298 such as a digital to analog (DAC) chip, digital signal processing chip, software applications, and/or other resources to process speech input and other audio data. When present, processor 814 can also communicate with a speech module 298 to process audio samples and other data. Processor 814 can in addition communicate with a network interface 822, such as an Ethernet or other wired, optical, or wireless interface, to communicate with other network links or resources, such as a cellular or other air interface. In one or more implementations, processor 814 and associated resources can be hosted in a wireless server. In one or more implementations, profiling server 170 can be co-hosted, and/or located separately or remotely from base station 106. In one or more implementations, multiple or distributed servers or processors can be used.

The foregoing description is illustrative, and variations in configuration and implementation may occur to persons skilled in the art. For instance, the various illustrative logics, logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In one or more exemplary implementations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. The steps of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE, and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

For further example, while aspects have been described in which profiling server 170 or other logic responds to sensed data including location device location information 146, user profile 118, and other data to generate recommendation information 144, in one or more implementations, the user of mobile device 102 can in addition or instead simply enter a set of search terms to view any locations or places which match the query terms in regional profile database 116, with or without other data. For further example, while implementations have been described in which a single user is tracked via a single mobile device 102, in one or more implementations the behavior and tagging information for one user can be aggregated from multiple mobile devices the user may use. Various other resources described as singular or integrated can In one or more implementations be plural or distributed, and resources described as multiple or distributed can In one or more implementations be combined. The scope of the present teachings is accordingly intended to be limited only by the following claims.

What is claimed is:

1. A method of operating a mobile device, comprising:
   displaying a plurality of categories of recommendations, the plurality of categories of recommendations being based on a regional profile of a geographic region, the regional profile including a set of points of interest within the geographic region, wherein the plurality of categories of recommendations is different for a first geographic region of a plurality of geographic regions compared to a second geographic region of the plurality of geographic regions;
   obtaining a selection of a category of the plurality of categories of recommendations;
   displaying, responsive to the obtained category of the plurality of categories of recommendations, at least one recommended point of interest from the set of points of interest via a user interface of the mobile device, wherein the at least one recommended point of interest is displayed based on at least user ratings of the set of points of interest within the geographic region, including the at least one recommended point of interest;
   obtaining a selection of a point of interest from among the displayed at least one recommended point of interest; and
   displaying user-uploaded content associated with the selected point of interest via the user interface of the mobile device, the user-uploaded content subject to privacy controls associated with a set of users that provided the user-uploaded content, wherein the privacy controls comprise one or more privacy controls permitting sharing by at least one user of the set of users that provided the user-uploaded content, and wherein the privacy controls comprise one or more privacy controls related to a display of temporal behavior patterns rather than actual locations of the at least one user.

2. The method of claim 1, wherein the privacy controls comprise one or more privacy controls related to a display of relative distances rather than actual locations of at least one user of the set of users that provided the user-uploaded content.

3. The method of claim 1, wherein the privacy controls comprise one or more privacy controls related to a display of mobility patterns rather than actual locations of at least one user of the set of users that provided the user-uploaded content.

4. The method of claim 1, wherein the privacy controls comprise one or more privacy controls related to time-based access rules associated with a subset of the user-uploaded content provided by at least one user of the set of users.

5. The method of claim 1, wherein the at least one recommended point of interest is displayed further based on a recommended time of day for visiting the at least one recommended point of interest.

6. The method of claim 1, wherein the at least one recommended point of interest is displayed further based on the user ratings having been generated within a predetermined period of time.

7. The method of claim 1, wherein the user-uploaded content includes:
   one or more user-captured images captured at the selected point of interest,
   one or more user-captured video clips captured at the selected point of interest,
   user-captured audio data captured at the selected point of interest,
   the user ratings of the set of points of interest, or
   any combination thereof.

8. The method of claim 1, further comprising:
   determining a current location of the mobile device.

9. The method of claim 8, wherein the geographic region includes the current location of the mobile device.

10. A mobile device, comprising:
    memory configured to store data, instructions, or a combination thereof; and
    at least one processor communicatively coupled to the memory, the at least one processor configured to:
      display a plurality of categories of recommendations, the plurality of categories of recommendations being based on a regional profile of a geographic region, the regional profile including a set of points of interest within the geographic region, wherein the plurality of categories of recommendations is different for a first geographic region of a plurality of geographic regions compared to a second geographic region of the plurality of geographic regions;
      obtain a selection of a category of the plurality of categories of recommendations;
      display, responsive to the obtained category of the plurality of categories of recommendations, at least one recommended point of interest from the set of points of interest via a user interface of the mobile device, wherein the at least one recommended point of interest is displayed based on at least user ratings of the set of points of interest within the geographic region, including the at least one recommended point of interest;
      obtain a selection of a point of interest from among the displayed at least one recommended point of interest; and
      display user-uploaded content associated with the selected point of interest via the user interface of the mobile device, the user-uploaded content subject to privacy controls associated with a set of users that provided the user-uploaded content, wherein the privacy controls comprise one or more privacy controls permitting sharing by at least one user of the set of users that provided the user-uploaded content, and wherein the privacy controls comprise one or more privacy controls related to a display of temporal behavior patterns rather than actual locations of the at least one user.

11. The mobile device of claim 10, wherein the privacy controls comprise one or more privacy controls related to a display of relative distances rather than actual locations of at least one user of the set of users that provided the user-uploaded content.

12. The mobile device of claim 10, wherein the privacy controls comprise one or more privacy controls related to a display of mobility patterns rather than actual locations of at least one user of the set of users that provided the user-uploaded content.

13. The mobile device of claim 10, wherein the privacy controls comprise one or more privacy controls related to time-based access rules associated with a subset of the user-uploaded content provided by at least one user of the set of users.

14. The mobile device of claim 10, wherein the at least one recommended point of interest is displayed further based on a recommended time of day for visiting the at least one recommended point of interest.

15. The mobile device of claim 10, wherein the at least one recommended point of interest is displayed further based on the user ratings having been generated within a predetermined period of time.

16. The mobile device of claim 10, wherein the user-uploaded content includes:
one or more user-captured images captured at the selected point of interest,
one or more user-captured video clips captured at the selected point of interest,
user-captured audio data captured at the selected point of interest,
the user ratings of the set of points of interest, or
any combination thereof.

17. The mobile device of claim 10, wherein the at least one processor is further configured to:
determine a current location of the mobile device.

18. The mobile device of claim 17, wherein the geographic region includes the current location of the mobile device.

19. A mobile device, comprising:
means for displaying a plurality of categories of recommendations, the plurality of categories of recommendations being based on a regional profile of a geographic region, the regional profile including a set of points of interest within the geographic region, wherein the plurality of categories of recommendations is different for a first geographic region of a plurality of geographic regions compared to a second geographic region of the plurality of geographic regions;
means for obtaining a selection of a category of the plurality of categories of recommendations;
means for displaying, responsive to the obtained category of the plurality of categories of recommendations, at least one recommended point of interest from the set of points of interest via a user interface of the mobile device, wherein the at least one recommended point of interest is displayed based on at least user ratings of the set of points of interest within the geographic region, including the at least one recommended point of interest;
means for obtaining a selection of a point of interest from among the displayed at least one recommended point of interest; and
means for displaying user-uploaded content associated with the selected point of interest via the user interface of the mobile device, the user-uploaded content subject to privacy controls associated with a set of users that provided the user-uploaded content, wherein the privacy controls comprise one or more privacy controls permitting sharing by at least one user of the set of users that provided the user-uploaded content, and wherein the privacy controls comprise one or more privacy controls related to a display of temporal behavior patterns rather than actual locations of the at least one user.

20. A non-transitory computer-readable medium storing computer-executable instructions, the computer-executable instructions comprising:
at least one instruction instructing a mobile device to display a plurality of categories of recommendations, the plurality of categories of recommendations being based on a regional profile of a geographic region, the regional profile including a set of points of interest within the geographic region, wherein the plurality of categories of recommendations is different for a first geographic region of a plurality of geographic regions compared to a second geographic region of the plurality of geographic regions;
at least one instruction instructing the mobile device to obtain a selection of a category of the plurality of categories of recommendations;
at least one instruction instructing the mobile device to display, responsive to the obtained category of the plurality of categories of recommendations, at least one recommended point of interest from the set of points of interest via a user interface of the mobile device, wherein the at least one recommended point of interest is displayed based on at least user ratings of the set of points of interest within the geographic region, including the at least one recommended point of interest;
at least one instruction instructing the mobile device to obtain a selection of a point of interest from among the displayed at least one recommended point of interest; and
at least one instruction instructing the mobile device to display user-uploaded content associated with the selected point of interest via the user interface of the mobile device, the user-uploaded content subject to privacy controls associated with a set of users that provided the user-uploaded content, wherein the privacy controls comprise one or more privacy controls permitting sharing by at least one user of the set of users that provided the user-uploaded content, and wherein the privacy controls comprise one or more privacy controls related to a display of temporal behavior patterns rather than actual locations of the at least one user.

* * * * *